US012606746B2

(12) United States Patent
Morishima et al.

(10) Patent No.: US 12,606,746 B2
(45) Date of Patent: Apr. 21, 2026

(54) COMPOSITION, OPTICALLY ANISOTROPIC LAYER, LIQUID CRYSTAL CELL, LIQUID CRYSTAL DISPLAY DEVICE, SENSOR, LENS, SWITCHING ELEMENT, ISOLATOR, AND CAMERA

(71) Applicant: FUJIFILM Corporation, Tokyo (JP)

(72) Inventors: Shinichi Morishima, Kanagawa (JP); Kazunari Yagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/919,071

(22) Filed: Oct. 17, 2024

(65) Prior Publication Data

US 2025/0043183 A1 Feb. 6, 2025

Related U.S. Application Data

(63) Continuation of application No. PCT/JP2023/017002, filed on May 1, 2023.

(30) Foreign Application Priority Data

May 13, 2022 (JP) ................................ 2022-079213

(51) Int. Cl.
*C09K 19/38* (2006.01)

(52) U.S. Cl.
CPC ................................ *C09K 19/3823* (2013.01)

(58) Field of Classification Search
CPC ...................................................... C09K 19/38
See application file for complete search history.

(56) References Cited

U.S. PATENT DOCUMENTS

| | | | | |
|---|---|---|---|---|
| 2007/0231479 | A1* | 10/2007 | Ogawa | B05C 5/0266 118/58 |
| 2011/0216273 | A1* | 9/2011 | He | C09K 19/60 349/158 |
| 2019/0271801 | A1 | 9/2019 | Mochizuki et al. | |
| 2022/0043395 | A1* | 2/2022 | Sato | G06V 10/147 |
| 2023/0104781 | A1 | 4/2023 | Naka et al. | |

FOREIGN PATENT DOCUMENTS

| | | | | |
|---|---|---|---|---|
| JP | 2021-026037 | A | 2/2021 | |
| JP | 2021-192095 | A | 12/2021 | |
| WO | 2018/088558 | A1 | 5/2018 | |
| WO | WO-2021176755 | A1 * | 9/2021 | C07F 9/6578 |

OTHER PUBLICATIONS

International Search Report issued in PCT/JP2023/017002 on Jul. 11, 2023.
Written Opinion issued in PCT/JP2023/017002 on Jul. 11, 2023.
International Preliminary Report on Patentability completed by WIPO on Nov. 7, 2024 in connection with International Patent Application No. PCT/JP2023/017002.
Lars May et al., Widely Electronically Tunable 2,6-Disubstituted Dithieno[1,4]thiazines-Eletron-Rich Fluorophores Up to Intense NIR Emission, Chemistry-A European Journal, Oct. 9, 2020, pp. 12978-12986, vol. 26, Issue 57, European Chemical Societies Publishing.

* cited by examiner

*Primary Examiner* — Chanceity N Robinson
(74) *Attorney, Agent, or Firm* — Edwards Neils LLC; Jean C. Edwards, Esq.

(57) ABSTRACT

An optically anisotropic layer; a liquid crystal cell; a liquid crystal display device; a sensor; a lens; a switching element; an isolator; and a camera include a composition, the composition which can form a liquid crystal layer having a maximal absorption wavelength in an infrared region (particularly, a wavelength of 1,000 to 1,700 nm) and excellent absorption anisotropy. The composition contains at least one specific compound selected from the group consisting of a coloring agent compound having a cationic structure represented by Formula (I) and a reduction body of the coloring agent compound, and a liquid crystal compound.

(I)

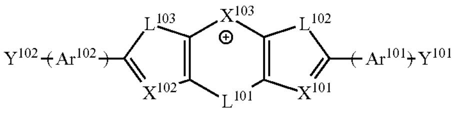

20 Claims, No Drawings

COMPOSITION, OPTICALLY ANISOTROPIC LAYER, LIQUID CRYSTAL CELL, LIQUID CRYSTAL DISPLAY DEVICE, SENSOR, LENS, SWITCHING ELEMENT, ISOLATOR, AND CAMERA

CROSS-REFERENCE TO RELATED APPLICATIONS

This application is a Continuation of PCT International Application No. PCT/JP2023/017002 filed on May 1, 2023, which was published under PCT Article 21(2) in Japanese, and which claims priority under 35 U.S.C. § 119(a) to Japanese Patent Application No. 2022-079213 filed on May 13, 2022. The above applications are hereby expressly incorporated by reference, in their entirety, into the present application.

BACKGROUND OF THE INVENTION

1. Field of the Invention

The present invention relates to a composition, an optically anisotropic layer, a liquid crystal cell, a liquid crystal display device, a sensor, a lens, a switching element, an isolator, and a camera.

2. Description of the Related Art

In recent years, there has been a demand for a light absorption anisotropic film having absorption in an infrared region in various applications such as a display device, a camera, and a sensor.

For example, WO2018/088558A discloses a polarizing plate having absorption in an infrared region, which is the light absorption anisotropic film. The above-described polarizing plate is obtained by infusing a polyvinyl alcohol film with a dichroic substance which absorbs infrared rays by an infusing treatment, and stretching the obtained film.

SUMMARY OF THE INVENTION

On the other hand, in recent years, with the development of a sensor device, there has been a demand for a film which has absorption in a short-wave infrared region (SWIR; wavelength of 1,000 to 1,700 nm) having a longer wavelength than a near-infrared region (NIR; wavelength of 780 to 1,000 nm) and has absorption anisotropy in this SWIR region.

As a result of examination on absorption anisotropy of the polarizing plate disclosed in WO2018/088558A, the present inventors have found that the current requirement level has not been satisfied and thus further improvement is necessary.

An object of the present invention is to provide a composition with which a liquid crystal layer having a maximal absorption wavelength in an infrared region (particularly, a wavelength of 1,000 to 1,700 nm) and excellent absorption anisotropy can be formed.

Another object of the present invention is to provide an optically anisotropic layer, a liquid crystal cell, a liquid crystal display device, a sensor, a lens, a switching element, an isolator, and a camera.

As a result of intensive studies to achieve the above-described objects, the present inventors have found that a liquid crystal layer having a maximal absorption wavelength in an infrared region (particularly, a wavelength of 1,000 to 1,700 nm) and excellent absorption anisotropy can be formed using a composition containing a coloring agent compound having a cationic structure represented by Formula (I) described later and a reduction body thereof, and have completed the present invention.

In other words, it has been found that the above-described objects can be achieved by adopting the following configurations.

[1] A composition comprising:

at least one specific compound selected from the group consisting of a coloring agent compound having a cationic structure represented by Formula (I) described later and a reduction body of the coloring agent compound; and a liquid crystal compound.

[2] The composition according to [1], in which the liquid crystal compound is a rod-like liquid crystal compound or a disk-like liquid crystal compound.

[3] The composition according to [1] or [2], in which the liquid crystal compound is a polymerizable liquid crystal compound.

[4] The composition according to any one of [1] to [3], in which the specific compound has a maximal absorption wavelength in a wavelength range of 700 to 1800 nm.

[5] An optically anisotropic layer comprising:

at least one specific compound selected from the group consisting of a coloring agent compound having a cationic structure represented by Formula (I) described later and a reduction body of the coloring agent compound; and a liquid crystal compound.

[6] An optically anisotropic layer obtained by fixing an alignment state of a composition which contains at least one specific compound selected from the group consisting of a coloring agent compound having a cationic structure represented by Formula (I) described later and a reduction body of the coloring agent compound, and a polymerizable liquid crystal compound.

[7] A liquid crystal cell comprising:

a pair of electrodes; and a liquid crystal layer provided between the electrodes, which is formed of the composition according to any one of [1] to [4].

[8] A liquid crystal display device comprising:

the optically anisotropic layer according to [5] or [6].

[9] A sensor comprising:

the optically anisotropic layer according to [5] or [6].

[10] A lens comprising:

the optically anisotropic layer according to [5] or [6].

[11] A switching element comprising:

the optically anisotropic layer according to [5] or [6].

[12] An isolator comprising:

the optically anisotropic layer according to [5] or [6].

[13] A camera comprising:

the optically anisotropic layer according to [5] or [6].

According to the present invention, it is possible to provide a composition with which a liquid crystal layer having a maximal absorption wavelength in an infrared region (particularly, a wavelength of 1,000 to 1,700 nm) and excellent absorption anisotropy can be formed.

In addition, according to the present invention, it is possible to provide an optically anisotropic layer, a liquid crystal cell, a liquid crystal display device, a sensor, a lens, a switching element, an isolator, and a camera.

DESCRIPTION OF THE PREFERRED EMBODIMENTS

Hereinafter, the present invention will be described in detail.

The description of configuration requirements described below may be made based on typical embodiments of the present invention, but the present invention is not limited to such embodiments.

Any numerical range expressed using "to" in the present specification refers to a range including the numerical values before and after the "to" as a lower limit value and an upper limit value, respectively.

In addition, in the present specification, substances corresponding to respective components may be used alone or in combination of two or more kinds thereof. Here, in a case where two or more kinds of substances are used in combination for each component, the content of the component indicates the total content of the substances used in combination, unless otherwise specified.

In addition, in the present specification, "(meth)acryl" denotes "acryl" or "methacryl", and "(meth)acryloyl" denotes "acryloyl" or "methacryloyl".

In addition, in the present specification, a relationship between angles (for example, "orthogonal", "parallel", and the like) is intended to include a range of errors acceptable in the art to which the present invention belongs. For example, it means that an angle is in an error range of ±5° with respect to the exact angle, and the error with respect to the exact angle is preferably in a range of ±3°.

In addition, in the present specification, "may have a substituent" includes not only an aspect of not having a substituent but also an aspect of having one or more substituents.

Here, examples of the substituent include substituents described in the following substituent group A.

<Substituent Group A>

The substituent group A represents a halogen atom (for example, a fluorine atom, a chlorine atom, or a bromine atom; preferably a chlorine atom or a fluorine atom and more preferably a fluorine atom);

an alkyl group (a linear, branched, or cyclic alkyl group having preferably 1 to 48 carbon atoms, more preferably 1 to 24 carbon atoms, and particularly preferably 1 to 8 carbon atoms, such as a linear alkyl group having 1 to 6 carbon atoms (for example, a methyl group, an ethyl group, an n-propyl group, an n-butyl group, an n-pentyl group, and an n-hexyl group), a branched alkyl group having 3 to 6 carbon atoms (for example, an isopropyl group, an isobutyl group, a tert-butyl group, a sec-butyl group, a neopentyl group, an isohexyl group, and a 3-methylpentyl group), and a cyclic alkyl group having 3 to 12 carbon atoms (for example, a cyclopropyl group, a cyclopentyl group, a cyclohexyl group, a 1-norbornyl group, and a 1-adamantyl group));

an alkenyl group (an alkenyl group having preferably 2 to 48 carbon atoms and more preferably 2 to 18 carbon atoms, such as a vinyl group, an allyl group, a 1-butene group, and a 2-butene group);

an alkynyl group (an alkynyl group having preferably 2 to 6 carbon atoms and more preferably 2 to 4 carbon atoms, such as an ethynyl group, a 1-propynyl group, a propargyl group, a 1-butylnyl group, and a 2-butylnyl group);

an aryl group (an aryl group having preferably 6 to 48 carbon atoms and more preferably 6 to 24 carbon atoms, such as a phenyl group, an oligoaryl group (a naphthyl group or an anthryl group), a phenanthrenyl group, a fluorenyl group, a pyrenyl group, a triphenylenyl group, and a biphenyl group);

a heteroaryl group (a heterocyclic group having preferably 1 to 32 carbon atoms and more preferably 1 to 18 carbon atoms, such as a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, and a benzotriazol-1-yl group);

an arylalkyl group (an arylalkyl group having preferably 7 to 15 carbon atoms, such as a benzyl group, a phenethyl group, a methylbenzyl group, a phenylpropyl group, a 1-methylphenylethyl group, a phenylbutyl group, a 2-methylphenylpropyl group, a tetrahydronaphthyl group, a naphthylmethyl group, a naphthylethyl group, an indenyl group, a fluorenyl group, an anthracenylmethyl group (an anthrylmethyl group), and a phenanthrenylmethyl group (a phenanthrylmethyl group));

a silyl group (a silyl group having preferably 3 to 38 carbon atoms and more preferably 3 to 18 carbon atoms, such as a trimethylsilyl group, a triethylsilyl group, a tributylsilyl group, a t-butyldimethylsilyl group, and a t-hexyldimethylsilyl group);

a hydroxy group; a cyano group; a nitro group; a morpholino group;

an alkoxy group (an alkoxy group having preferably 1 to 48 carbon atoms and more preferably 1 to 24 carbon atoms, such as a methoxy group, an ethoxy group, a 1-butoxy group, a 2-butoxy group, an isopropoxy group, a t-butoxy group, a dodecyloxy group, and a cycloalkyloxy group (for example, a cyclopentyloxy group or a cyclohexyloxy group));

an aryloxy group (an aryloxy group having preferably 6 to 48 carbon atoms and more preferably 6 to 24 carbon atoms, such as a phenoxy group and a 1-naphthoxy group);

an alkenyloxy group (an alkenyloxy group having preferably 2 to 6 carbon atoms, such as a vinyloxy group, a 1-propenyloxy group, a 2-n-propenyloxy group (an allyloxy group), a 1-n-butenyloxy group, and a prenyloxy group);

a heterocyclic oxy group (a heterocyclic oxy group having preferably 1 to 32 carbon atoms and more preferably 1 to 18 carbon atoms, such as a 1-phenyltetrazole-5-oxy group and a 2-tetrahydropyranyloxy group);

a silyloxy group (a silyloxy group having preferably 1 to 32 carbon atoms and more preferably 1 to 18 carbon atoms, such as a trimethylsilyloxy group, a t-butyldimethylsilyloxy group, and a diphenylmethylsilyloxy group);

an acyloxy group (an acyloxy group having preferably 2 to 48 carbon atoms and more preferably 2 to 24 carbon atoms, such as an acetoxy group, a pivaloyloxy group, a benzoyloxy group, and a dodecanoyloxy group);

a hydroxyalkyleneoxy group (a hydroxyalkyleneoxy group having preferably 2 to 10 carbon atoms, such as a hydroxyethyleneoxy group);

an alkoxycarbonyloxy group (an alkoxycarbonyloxy group having preferably 2 to 48 carbon atoms and more preferably 2 to 24 carbon atoms, such as an ethoxycarbonyloxy group, a t-butoxycarbonyloxy group, and a cycloalkyloxycarbonyloxy group (for example, a cyclohexyloxycarbonyloxy group));

an aryloxycarbonyloxy group (an aryloxycarbonyloxy group having preferably 7 to 32 carbon atoms and more preferably 7 to 24 carbon atoms, such as a phenoxycarbonyloxy group);

a carbamoyloxy group (a carbamoyloxy group having preferably 1 to 48 carbon atoms and more preferably 1 to 24 carbon atoms, such as an N,N-dimethylcarbamoyloxy group, an N-butylcarbamoyloxy group, an N-phenylcarbamoyloxy group, and an N-ethyl-N-phenylcarbamoyloxy group);

a sulfamoyloxy group (a sulfamoyloxy group having preferably 1 to 32 carbon atoms and more preferably 1 to 24 carbon atoms, such as an N,N-diethylsulfamoyloxy group and an N-propylsulfamoyloxy group);

an alkylsulfonyloxy group (an alkylsulfonyloxy group having preferably 1 to 38 carbon atoms and more preferably 1 to 24 carbon atoms, such as a methylsulfonyloxy group, a hexadecylsulfonyloxy group, and a cyclohexylsulfonyloxy group);

an arylsulfonyloxy group (an arylsulfonyloxy group having preferably 6 to 32 carbon atoms and more preferably 6 to 24 carbon atoms, such as a phenylsulfonyloxy group);

an acyl group (an acyl group having preferably 1 to 48 carbon atoms and more preferably 1 to 24 carbon atoms, such as a formyl group, an acetyl group, an acryloyl group, a methacryloyl group, a pivaloyl group, a benzoyl group, a tetradecanoyl group, and a cyclohexanoyl group);

an alkoxycarbonyl group (an alkoxycarbonyl group having preferably 2 to 48 carbon atoms and more preferably 2 to 24 carbon atoms, such as a methoxycarbonyl group, an ethoxycarbonyl group, an octadecyloxycarbonyl group, a cyclohexyloxycarbonyl group, and a 2,6-di-tert-butyl-4-methylcyclohexyloxycarbonyl group);

an aryloxycarbonyl group (an aryloxycarbonyl group having preferably 7 to 32 carbon atoms and more preferably 7 to 24 carbon atoms, such as a phenoxycarbonyl group);

a carbamoyl group (a carbamoyl group having preferably 1 to 48 carbon atoms and more preferably 1 to 24 carbon atoms, such as a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, an N-methyl-N-phenylcarbamoyl group, and an N,N-dicyclohexylcarbamoyl group);

an amino group (an amino group having preferably 32 or less carbon atoms and more preferably 24 or less carbon atoms, such as an amino group, a methylamino group, an N,N-dibutylamino group, a tetradecylamino group, a 2-ethylhexylamino group, and a cyclohexylamino group);

an anilino group (an anilino group having preferably 6 to 32 carbon atoms and more preferably 6 to 24 carbon atoms, such as an anilino group and an N-methylanilino group);

a heterocyclic amino group (a heterocyclic amino group having preferably 1 to 32 carbon atoms and more preferably 1 to 18 carbon atoms, such as a 4-pyridylamino group);

a carbonamide group (a carbonamide group having preferably 2 to 48 carbon atoms and more preferably 2 to 24 carbon atoms, such as an acetamide group, a benzamide group, a tetradecaneamide group, a pivaloylamide group, and a cyclohexaneamide group);

a ureido group (a ureido group having preferably 1 to 32 carbon atoms and more preferably 1 to 24 carbon atoms, such as a ureido group, an N,N-dimethylureido group, and an N-phenylureido group);

an imide group (an imide group having preferably 36 or less carbon atoms and more preferably 24 or less carbon atoms, such as an N-succinimide group and an N-phthalimide group);

an alkoxycarbonylamino group (an alkoxycarbonylamino group having preferably 2 to 48 carbon atoms and more preferably 2 to 24 carbon atoms, such as a methoxycarbonylamino group, an ethoxycarbonylamino group, a t-butoxycarbonylamino group, an octadecyloxycarbonylamino group, and a cyclohexyloxycarbonylamino group);

an aryloxycarbonylamino group (an aryloxycarbonylamino group having preferably 7 to 32 carbon atoms and more preferably 7 to 24 carbon atoms, such as a phenoxycarbonylamino group);

a sulfonamide group (a sulfonamide group having preferably 1 to 48 carbon atoms and more preferably 1 to 24 carbon atoms, such as a methanesulfonamide group, a butanesulfonamide group, a benzenesulfonamide group, a hexadecanesulfonamide group, and a cyclohexanesulfonamide group);

a sulfamoylamino group (a sulfamoylamino group having preferably 1 to 48 carbon atoms and more preferably 1 to 24 carbon atoms, such as an N,N-dipropylsulfamoylamino group and an N-ethyl-N-dodecylsulfamoylamino group);

an azo group (an azo group having preferably 1 to 32 carbon atoms and more preferably 1 to 24 carbon atoms, such as a phenylazo group and a 3-pyrazolylazo group);

an alkylthio group (an alkylthio group having preferably 1 to 48 carbon atoms and more preferably 1 to 24 carbon atoms, such as a methylthio group, an ethylthio group, an octylthio group, and a cyclohexylthio group);

an arylthio group (an arylthio group having preferably 6 to 48 carbon atoms and more preferably 6 to 24 carbon atoms, such as a phenylthio group);

a heterocyclic thio group (a heterocyclic thio group having preferably 1 to 32 carbon atoms and more preferably 1 to 18 carbon atoms, such as a 2-benzothiazolylthio group, a 2-pyridylthio group, and a 1-phenyltetrazolylthio group);

an alkylsulfinyl group (an alkylsulfinyl group having preferably 1 to 32 carbon atoms and more preferably 1 to 24 carbon atoms, such as a dodecanesulfinyl group);

an arylsulfinyl group (an arylsulfinyl group having preferably 6 to 32 carbon atoms and more preferably 6 to 24 carbon atoms, such as a phenylsulfinyl group);

an alkylsulfonyl group (an alkylsulfonyl group having preferably 1 to 48 carbon atoms and more preferably 1 to 24 carbon atoms, such as a methylsulfonyl group, an ethylsulfonyl group, a propylsulfonyl group, a butylsulfonyl group, an isopropylsulfonyl group, a 2-ethylhexylsulfonyl group, a hexadecylsulfonyl group, an octylsulfonyl group, and a cyclohexylsulfonyl group);

an arylsulfonyl group (an arylsulfonyl group having preferably 6 to 48 carbon atoms and more preferably 6 to 24 carbon atoms, such as a phenylsulfonyl group and a 1-naphthylsulfonyl group);

a sulfamoyl group (a sulfamoyl group having preferably 32 or less carbon atoms and more preferably 24 or less carbon atoms, such as a sulfamoyl group, an N,N-dipropylsulfamoyl group, an N-ethyl-N-dodecylsulfamoyl group, an N-ethyl-N-phenylsulfamoyl group, an N-cyclohexylsulfamoyl group, and an N-(2-ethylhexyl) sulfamoyl group);

a phosphonyl group (a phosphonyl group having preferably 1 to 32 carbon atoms and more preferably 1 to 24 carbon atoms, such as a phenoxyphosphonyl group, an octyloxyphosphonyl group, and a phenylphosphonyl group);

a phosphinoylamino group (a phosphinoylamino group having preferably 1 to 32 carbon atoms and more preferably 1 to 24 carbon atoms, such as a diethoxyphosphinoylamino group and a dioctyloxyphosphinoylamino group);

an epoxy group; a (meth)acryloyl group; —$NHCOCH_3$; —$SO_2NHC_2H_4OCH_3$; or —$NHSO_2CH_3$.

[Composition]

The composition according to the embodiment of the present invention is a composition containing at least one specific compound selected from the group consisting of a coloring agent compound having a cationic structure represented by Formula (I) described later and a reduction body of the coloring agent compound, and a liquid crystal compound.

[Specific Compound]

The specific compound contained in the composition according to the embodiment of the present invention is at least one compound selected from the group consisting of a coloring agent compound having a cationic structure represented by Formula (I) (hereinafter, also abbreviated as "specific coloring agent compound"), and a reduction body thereof.

Here, it is preferable that the specific coloring agent compound has an anionic structure together with the cationic structure represented by Formula (I). The anionic structure may be included as a free anion (ion), or may be linked to the cationic structure through a covalent bond.

(I)

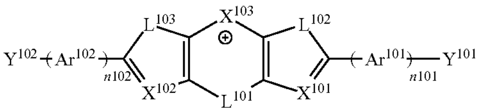

In Formula (I), $L^{101}$ represents —P(=X)$R^A$—, —Si$R^A_2$—, —B$R^A$—, —S(=X)—, or —S(=X)$_2$—, where $R^A$ represents a hydrogen atom or a substituent, provided that, in a case of a plurality of $R^A$'s, the plurality of $R^A$'s may be the same or different from each other, and X represents an oxygen atom, a sulfur atom, or a selenium atom;

$L^{102}$ and $L^{103}$ each independently represent —S— or —$X^{104}$=$X^{105}$—, where $X^{104}$ and $X^{105}$ represent —N= or —C($R^A$)=, and $R^A$ represents a hydrogen atom or a substituent;

$X^{101}$ and $X^{102}$ each independently represent —N= or —C($R^A$)=, where $R^A$ represents a hydrogen atom or a substituent, provided that, in a case where $X^{101}$ is —C($R^A$)=, the substituent as one aspect of $R^A$ may be bonded to $Ar^{101}$ to form a ring, and in a case where $X^{102}$ is —C($R^A$)=, the substituent as one aspect of $R^A$ may be bonded to $Ar^{102}$ to form a ring;

$X^{103}$ represents —$N^+R^B_2$— or —$C^+R^B$—, where $R^B$ represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent, provided that, in a case of a plurality of $R^B$'s, the plurality of $R^B$'s may be the same or different from each other;

$Ar^{101}$ and $Ar^{102}$ each independently represent an alkenylene group which may have a substituent, an arylene group which may have a substituent, or a heteroarylene group which may have a substituent, where the arylene group and the heteroarylene group may be monocyclic or polycyclic, and in a case where the heteroarylene group is polycyclic, at least one of a plurality of ring structures may be a hetero ring;

$Y^{101}$ and $Y^{102}$ each independently represent —O$R^C$, —N$R^C_2$, or —S$R^C$, where $R^C$ represents a hydrogen atom, an alkyl group which may have a substituent, an alkenyl group which may have a substituent, an alkynyl group which may have a substituent, an aryl group which may have a substituent, or a heteroaryl group which may have a substituent, provided that, in a case of a plurality of $R^C$'s, the plurality of $R^C$'s may be the same or different from each other, and the substituent which may be included in the alkyl group, the alkenyl group, the alkynyl group, the aryl group, and the heteroaryl group may be bonded to $Ar^{11}$ or $Ar^{102}$ to form a ring; and n101 and n102 each independently represent 1 or 2, provided that, in a case where n101 is 2, a plurality of $Ar^{101}$'s may be the same or different from each other, and in a case where n102 is 2, a plurality of $Ar^{102}$'s may be the same or different from each other.

Examples of the "substituent" described in each of the above-described symbols in Formula (I) include those described in the substituent group A above.

In Formula (I), as described above, $L^{101}$ represents —P(=X)$R^A$—, —Si$R^A_2$—, —B$R^A$—, —S(=X)—, or —S(=X)$_2$—. $R^A$ represents a hydrogen atom or a substituent, in which, in a case of a plurality of $R^A$'s, the plurality of $R^A$'s may be the same or different from each other. X represents an oxygen atom, a sulfur atom, or a selenium atom.

Regarding "—P(=X)$R^A$—" as one aspect of $L^{101}$, X is preferably an oxygen atom or a sulfur atom, and from the viewpoint of ease of synthesis and solubility in a solvent, an oxygen atom is more preferable.

In addition, it is more preferable that $R^A$ represents an alkyl group, an alkenyl group, an alkynyl group, an aryl group, or a heteroaryl group, which may have a substituent. Examples thereof include those described in the substituent group A above.

Regarding "–Si$R^A_2$—" as one aspect of $L^{101}$, $R^A$ preferably represents an alkyl group, an alkenyl group, an alkynyl group, an aryl group, a heteroaryl group, an alkoxy group, an aryloxy group, or an alkenyloxy group, which may have a substituent. Examples thereof include those described in the substituent group A above.

In addition, a plurality of $R^A$'s may be the same or different from each other.

In addition, two $R^A$'s may form a ring, or $R^A$ may be bonded to a hetero ring containing adjacent S to form a ring.

Regarding "—B$R^A$—" as one aspect of $L^{101}$, $R^A$ preferably represents an alkyl group, an alkenyl group, an alkynyl group, an aryl group, a heteroaryl group, an alkoxy group, an aryloxy group, or an alkenyloxy group, which may have a substituent. Examples thereof include those described in the substituent group A above.

In addition, $R^A$ may be bonded to a hetero ring containing adjacent S to form a ring.

Regarding "—S(=X)—" and "—S(=X)$_2$—" as one aspect of $L^{101}$, X is preferably an oxygen atom or a sulfur atom, and from the viewpoint of ease of synthesis and solubility in a solvent, an oxygen atom is more preferable.

In the present invention, from the viewpoint of synthetic suitability, $L^{101}$ in Formula (I) is preferably "—P(=X)$R^A$—", more preferably "—P(=O)$R^A$—", and still more preferably "—P(=O)Ph-(Ph: a phenyl group)".

In Formula (I), as described above, $L^{102}$ and $L^{103}$ each independently represent —S— or —$X^{104}$=$X^{105}$—. $X^{104}$ and $X^{105}$ represent —N= or —C($R^A$)=. $R^A$ represents a hydrogen atom or a substituent.

Here, $X^{104}$ and $X^{105}$ preferably represent —C($R^A$)=.

In addition, $R^A$ preferably represents a hydrogen atom.

In the present invention, from the viewpoint of long-wavelength shift, $L^{102}$ and $L^{103}$ in Formula (I) are preferably "—S—".

In Formula (I), as described above, $X^{101}$ and $X^{102}$ each independently represent —N= or —C($R^A$)=. $R^A$ represents a hydrogen atom or a substituent. In a case where $X^{101}$ is —C($R^A$)=, the substituent as one aspect of $R^A$ may be bonded to $Ar^{101}$ to form a ring, and in a case where $X^{102}$ is —C($R^A$)=, the substituent as one aspect of $R^A$ may be bonded to $Ar^{102}$ to form a ring.

In the present invention, from the viewpoint of stability, $X^{101}$ and $X^{102}$ preferably represent —C($R^A$)=.

In addition, $R^A$ preferably represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent. Examples of the halogen atom, the alkyl group, and the like include those described in the substituent group A above.

In Formula (I), as described above, $X^{103}$ represents —$N^+R^B_2$— or —$C^+R^B$—. $R^B$ represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent, in which, in a case of a plurality of $R^B$'s, the plurality of $R^B$'s may be the same or different from each other. Examples of the halogen atom, the alkyl group, and the like represented by $R^B$ include those described in the substituent group A above.

In the present invention, from the viewpoint of stability in a nucleophilic species (solvent, water, and the like), $X^{103}$ preferably represents —$C^+R^B$—.

Here, depending on the type of $R^B$, it is also possible to adjust the maximal absorption wavelength, the solubility, the tone (colorless transparency), the stability of the material, and the like.

Specifically, from the viewpoint of easily improving solubility, easily making colorless and transparent, and ensuring stability, $R^B$ is preferably an aryl group which may have a substituent, a heteroaryl group which may have a substituent, or the like; more preferably an aryl group which may have a substituent; still more preferably a monocyclic aryl group which may have a substituent; particularly preferably a monocyclic aryl group having a substituent at an ortho position (a phenyl group having a substituent at an ortho position); and most preferably a 2,4,6-trimethylphenyl group, a 2,6-dimethoxyphenyl group, or the like. From the viewpoint of stability in a nucleophilic species (solvent, water, and the like) which may decompose the material, it is preferable to use a bulkier group.

In Formula (I), as described above, $Ar^{101}$ and $Ar^{102}$ each independently represent an alkenylene group which may have a substituent, an arylene group which may have a substituent, or a heteroarylene group which may have a substituent. The arylene group and the heteroarylene group may be monocyclic or polycyclic, and in a case where the heteroarylene group is polycyclic, at least one of a plurality of ring structures may be a hetero ring.

Here, as the alkenylene group, an alkenylene group having 2 to 12 carbon atoms is preferable, and examples thereof include an ethenylene group, a propenylene group, and a butenylene group.

The arylene group is preferably an arylene group having 6 to 10 carbon atoms, and examples thereof include a phenylene group, a tolylene group, and a naphthylene group.

Examples of the heteroarylene group include a divalent group obtained by removing any two hydrogen atoms from a pyrazole ring, a thiazole ring, an oxazole ring, an imidazole ring, an oxadiazole ring, a thiadiazole ring, a triazole ring, a pyridine ring, a pyridazine ring, a pyrimidine ring, a pyrazine ring, such the benzo-fused ring (for example, a benzothiazole ring and a benzopyrazine ring) or a naphtho-fused ring, or a composite body of these fused rings.

In the present invention, from the viewpoint of long-wavelength shift and molecular linearity, $Ar^{101}$ and $Ar^{102}$ are preferably an arylene group which may have a substituent or a heteroarylene group which may have a substituent, and more preferably an arylene group which may have a substituent.

In Formula (I), as described above, $Y^{101}$ and $Y^{102}$ each independently represent —$OR^C$, —$NR^C_2$, or —$SR^C$. $R^C$ represents a hydrogen atom, an alkyl group which may have a substituent, an alkenyl group which may have a substituent, an alkynyl group which may have a substituent, an aryl group which may have a substituent, or a heteroaryl group which may have a substituent, in which, in a case of a plurality of $R^C$'s, the plurality of $R^C$'s may be the same or different from each other. The substituent which may be included in the alkyl group, the alkenyl group, the alkynyl group, the aryl group, and the heteroaryl group may be bonded to $Ar^{101}$ or $Ar^{102}$ to form a ring. Examples of the alkyl group, the alkenyl group, and the like represented by $R^C$ include those described in the substituent group A above.

In the present invention, from the viewpoint of long-wavelength shift, $Y^{101}$ and $Y^{102}$ are preferably —$OR^C$ or —$NR^C_2$, and more preferably —$NR^C_2$.

In Formula (I), as described above, n101 and n102 each independently represent 1 or 2. In a case where n101 is 2, a plurality of $Ar^{101}$'s may be the same or different from each other, and in a case where n102 is 2, a plurality of $Ar^{102}$'s may be the same or different from each other.

In the present invention, from the viewpoint of synthetic suitability and molecular linearity, n101 and n102 are preferably 1.

<Anionic Structure>

Examples of the optional anionic structure included in the specific coloring agent compound include an anion represented by Formula (AN1), an anion represented by Formula (AN2), an anion represented by Formula (AN3), an anion represented by Formula (AN4), an anion represented by Formula (AN5), a fluorine anion, a chlorine anion, a bromine anion, an iodine anion, a cyanide ion, a perchlorate anion, a carboxylate anion, a sulfonate anion, a phosphate anion, a heteropoly acid (phosphotungstic acid, phosphomolybdic acid, phosphotungstomolybdic acid, silicotungstic acid, silicomolybdic acid, silicotungstomolybdic acid, or the like) anion, and an isopoly acid (tungstic acid, molybdic acid, or the like) anion.

As described above, these anionic structures may be included as a free anion (ion), or may be linked to the cationic structure represented by Formula (I) through a covalent bond.

(AN1)

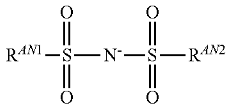

(AN2)

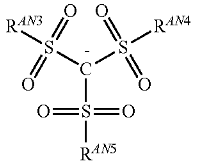

(AN3)

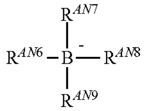

(AN4)

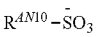

(AN5)

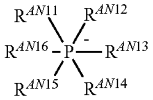

In Formula (AN1), $R^{AN1}$ and $R^{AN2}$ each independently represent a halogen atom or an alkyl group, and $R^{AN1}$ and $R^{AN2}$ may be bonded to each other to form a ring.

In Formula (AN2), $R^{AN3}$ to $R^{AN5}$ each independently represent a halogen atom or an alkyl group, and $R^{AN}3$ and $R^{AN4}$, $R^{AN4}$ and $R^{AN}5$, or $R^{AN}3$ and $R^{AN5}$ may be bonded to each other to form a ring.

In Formula (AN3), $R^{AN6}$ to $R^{AN9}$ each independently represent a halogen atom, an alkyl group, an aryl group, an alkoxy group, an aryloxy group, or a cyano group.

In Formula (AN4), $R^{AN10}$ represents a halogenated hydrocarbon group which may be linked by a linking group having a nitrogen atom or an oxygen atom.

In Formula (AN5), $R^{AN11}$ to $R^{AN16}$ each independently represent a halogen atom or a halogenated hydrocarbon group.

Here, examples of the halogen atom as one aspect of $R^{AN1}$ and $R^{AN2}$ in Formula (AN1), the halogen atom as one aspect of $R^{AN3}$ to $R^{AN5}$ in Formula (AN2), and the halogen atom represented by $R^{AN6}$ to $R^{AN9}$ in Formula (AN3) include a fluorine atom, a chlorine atom, a bromine atom, and an iodine atom; and a fluorine atom is preferable.

In addition, the number of carbon atoms in the alkyl group as one aspect of $R^{AN1}$ and $R^{AN2}$ in Formula (AN1), the alkyl group as one aspect of $R^{AN}3$ to $R^{AN5}$ in Formula (AN2), and the alkyl group as one aspect of $R^{AN6}$ to $R^{AN9}$ in Formula (AN3) is preferably 1 to 10, more preferably 1 to 6, and still more preferably 1 to 3. Examples of the alkyl group include a linear alkyl group, a branched alkyl group, and a cyclic alkyl group; and a linear alkyl group or a branched alkyl group is preferable and a linear alkyl group is more preferable. The alkyl group may have a substituent or may be unsubstituted. The alkyl group is preferably an alkyl group having a halogen atom as a substituent, and more preferably an alkyl group (fluoroalkyl group) having a fluorine atom as a substituent. In addition, the fluoroalkyl group is preferably a perfluoroalkyl group.

The number of carbon atoms in the aryl group as one aspect of $R^{AN6}$ to $R^{AN9}$ in Formula (AN3) is preferably 6 to 20, more preferably 6 to 12, and still more preferably 6. The aryl group may have a substituent or may be unsubstituted. Examples of the substituent include a halogen atom and an alkyl group. The halogen atom is preferably a fluorine atom. The alkyl group is preferably a fluoroalkyl group.

In addition, the number of carbon atoms in the alkoxy group as one aspect of $R^{AN6}$ to $R^{AN}9$ in Formula (AN3) is preferably 1 to 10, more preferably 1 to 6, and still more preferably 1 to 3. Examples of the alkoxy group include a linear alkoxy group, a branched alkoxy group, and a cyclic alkoxy group; and a linear alkoxy group or a branched alkoxy group is preferable and a linear alkoxy group is more preferable. The alkoxy group may have a substituent or may be unsubstituted. Examples of the substituent include a halogen atom and an alkyl group. The halogen atom is preferably a fluorine atom. The alkyl group is preferably a fluoroalkyl group.

In addition, the number of carbon atoms in the aryloxy group as one aspect of $R^{AN6}$ to $R^{AN9}$ in Formula (AN3) is preferably 6 to 20, more preferably 6 to 12, and still more preferably 6. The aryloxy group may have a substituent or may be unsubstituted. Examples of the substituent include a halogen atom and an alkyl group. The halogen atom is preferably a fluorine atom. The alkyl group is preferably a fluoroalkyl group.

In addition, the halogenated hydrocarbon group represented by $R^{AN10}$ in Formula (AN4) refers to a monovalent hydrocarbon group substituted with a halogen atom, and is preferably a monovalent hydrocarbon group substituted with a fluorine atom.

Examples of the hydrocarbon group include an alkyl group and an aryl group. The monovalent hydrocarbon group substituted with a halogen atom may further have a substituent. Examples of a linking group having a nitrogen atom or an oxygen atom include —O—, —CO—, —COO—, and —CO—NH—.

Examples of the halogen atom as one aspect of $R^{AN1}$ to $R^{AN16}$ in Formula (AN5) include a fluorine atom, a chlorine atom, a bromine atom, and an iodine atom; and a fluorine atom is preferable.

In addition, as the halogenated hydrocarbon group as one aspect of $R^{AN11}$ to $R^{AN16}$ in Formula (AN5), an alkyl group having a halogen atom as a substituent is preferable, and an alkyl group having a fluorine atom as a substituent is more preferable.

<Other Cationic Structures>

The specific coloring agent compound may have other cationic structures different from the cationic structure represented by Formula (I) described above.

The other cationic structures may be a metal cation or an organic cation.

In addition, the other cationic structures may be included as a free anion (ion), or may be linked to the above-described anionic structure or the cationic structure represented by Formula (I) described above through a covalent bond.

From the viewpoint of improving light resistance or heat resistance, the metal cation is preferably a monovalent alkali metal cation or a divalent alkaline earth metal cation.

As the monovalent alkali metal cation, $Li^+$, $Na^+$, or $K^+$ is more preferable.

As the divalent alkaline earth metal cation, $Mg^{2+}$ or $Ba^{2+}$ is preferable.

The organic cation may be a monovalent organic cation or a polyvalent organic cation, but is preferably a monovalent organic cation.

Examples of the organic cation include a tetraalkylammonium ion, a trialalkylammonium ion, a pyridinium ion, an N-methylpyridinium ion, and an N-ethylpyridinium ion. Among these, the organic cation is preferably a trialkylammonium ion and more preferably a triethylammonium ion.

In addition, from the viewpoint of dispersibility, the organic cation may be a polyvalent organic cation.

Examples of the polyvalent organic cation include N,N,N',N'-tetramethylethylenediammonium and Catiomaster PD-7 (manufactured by Yokkaichi Chemical Co., Ltd.).

<Dye and Pigment>

The specific coloring agent compound may be a dye or a pigment.

In addition, the specific coloring agent compound may be a coloring agent multimer having a plurality of the cationic structures represented by Formula (I) described above in one molecule.

<<Case where Specific Coloring Agent Compound is Pigment>>

With regard to the pigment, a solubility at 25° C. in both propylene glycol monomethyl ether acetate and water is preferably 0.1 g/100 g (solvent).

In addition, an average particle diameter (r) of the pigment satisfies preferably 20 nm≤r≤300 nm, more preferably 25 nm≤r≤250 nm, and still more preferably 30 nm≤r≤200 nm.

The "average particle diameter" as described herein means an average particle diameter for secondary particles in which primary particles of the pigment are aggregated.

In addition, regarding a particle size distribution of the secondary particles of the pigment (hereinafter, simply referred to as "particle size distribution") which can be used, it is preferable that secondary particles having a particle diameter of (Average particle diameter±100) nm account for 70% by mass or more, preferably 80% by mass or more in the pigment. The particle size distribution of the secondary particles can be measured using a scattering intensity distribution. The pigment having the average particle diameter and the particle size distribution described above can be prepared by mixing and dispersing a pigment mixed solution while pulverizing the pigment mixed solution using a pulverizer such as a beads mill and a roll mill, the pigment mixed solution being obtained by mixing a commercially available pigment, another pigment (typically having an average particle diameter of secondary particles of more than 300 nm) which is optionally used, and a resin and an organic solvent which are preferably used with each other. The pigment thus obtained is typically in a form of a pigment dispersion liquid.

<<Case where Specific Coloring Agent Compound is Coloring Agent Multimer>>

The coloring agent multimer preferably includes a repeating unit represented by Formula (A).

In the coloring agent multimer, a proportion of the repeating unit represented by Formula (A) is preferably 10% to 100% by mass of all repeating units constituting the specific coloring agent compound. The lower limit thereof is more preferably 20% by mass or more, still more preferably 30% by mass or more, and even more preferably 50% by mass or more. The upper limit thereof is more preferably 95% by mass or less.

(A)

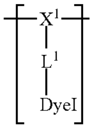

In Formula (A), $X^1$ represents a main chain of the repeating unit, and $L^1$ represents a single bond or a divalent linking group. DyeI represents the structure of the specific coloring agent compound having the cationic structure represented by Formula (I) described above.

The main chain of the repeating unit, represented by $X^1$ in Formula (A), usually represents a linking group formed by a polymerization reaction, and for example, a main chain derived from a compound having a (meth)acryloyl group, a styrene group, a vinyl group, or an ether group is preferable. In addition, an aspect in which the main chain has a cyclic alkylene group is also preferable.

$X^1$ is not particularly limited as long as it is a linking group formed from a known polymerizable monomer; and is preferably a linking group represented by (XX-1) to (XX-25), more preferably selected from (XX-1), (XX-2), (XX-10) to (XX-17), (XX-18), (XX-19), (XX-24), and (XX-25), and still more preferably selected from (XX-1), (XX-2), (XX-10) to (XX-17), (XX-24), and (XX-25).

In the formulae, * represents that the group is linked to $L^1$ at a site represented by *. Me represents a methyl group. In addition, R in (XX-18) and (XX-19) represents a hydrogen atom, an alkyl group having 1 to 5 carbon atoms, or a phenyl group.

(XX-1)

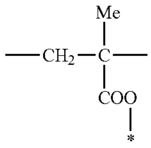

(XX-2)

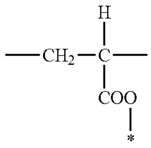

(XX-3)

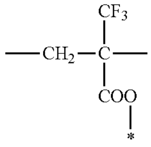

(XX-4)

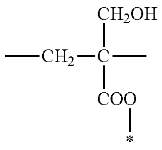

-continued
(XX-5)
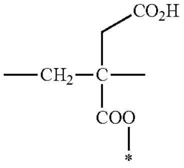
(XX-6)
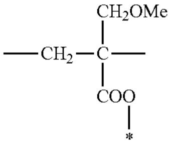
(XX-7)
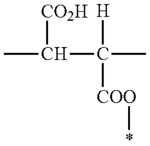
(XX-8)
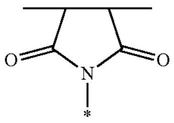
(XX-9)
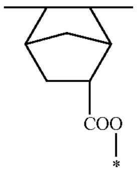
(XX-10)
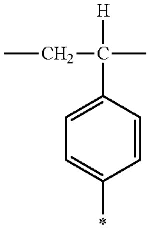
(XX-11)
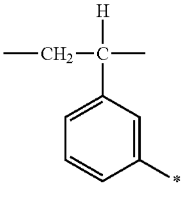
(XX-12)
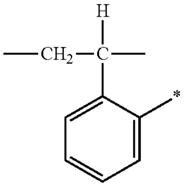
-continued
(XX-13)
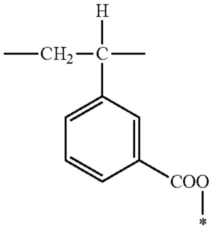
(XX-14)
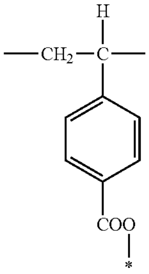
(XX-15)
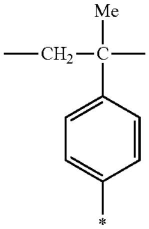
(XX-16)
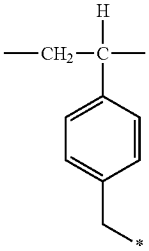
(XX-17)
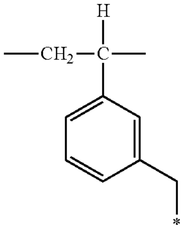
(XX-18)
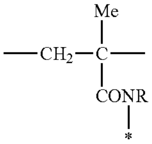
(XX-19)
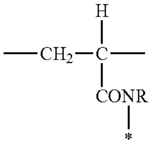

-continued (XX-20)

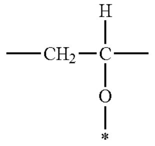

(XX-21)

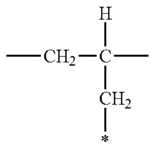

(XX-22)

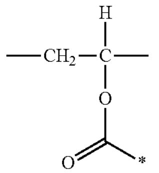

(XX-23)

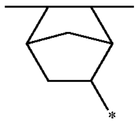

(XX-24)

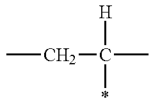

(XX-25)

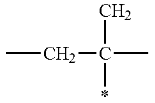

Examples of the divalent linking group as one aspect of $L^1$ in Formula (A) include an alkylene group having 1 to 30 carbon atoms, an arylene group having 6 to 30 carbon atoms, a heterocyclic linking group, —CH═CH—, —O—, —S—, —C(═O)—, —COO—, —NR—, —CONR—, —OCO—, —SO—, —$SO_2$—, and a linking group formed by linking two or more these groups. Here, R's each independently represent a hydrogen atom, an alkyl group, an aryl group, or a heteroaryl group.

The number of carbon atoms in the alkylene group is preferably 1 to 30. The upper limit thereof is more preferably 25 or less and still more preferably 20 or less. The lower limit thereof is more preferably 2 or more and still more preferably 3 or more. The alkylene group may be linear, branched, or cyclic.

The number of carbon atoms in the arylene group is more preferably 6 to 20 and still more preferably 6 to 12.

The heterocyclic linking group is preferably a 5-membered ring or a 6-membered ring. A heteroatom included in the heterocyclic linking group is preferably an oxygen atom, a nitrogen atom, or a sulfur atom. The number of heteroatoms included in the heterocyclic linking group is preferably 1 to 3.

As the divalent linking group as one aspect of $L^1$ in Formula (A), an alkylene group, an arylene group, —NH—, —CO—, —O—, —COO—, —OCO—, —S—, or a linking group formed by a combination of two or more of these groups is preferable; and an alkylene group, an arylene group, or a divalent group formed by a combination of the alkylene group or the arylene group, and one or more selected from —O—, —COO—, —OCO—, and —S— is more preferable.

The linking group linking DyeI and $X^1$ can also include —S—.

The number of atoms constituting the chain linking DyeI and $X^1$ in the divalent linking group as one aspect of $L^1$ in Formula (A) is preferably 3 or more, and more preferably 5 or more. The upper limit thereof may be, for example, 30 or less or 25 or less.

As described above, DyeI represents the structure of the specific coloring agent compound having the cationic structure represented by Formula (I) described above.

Here, $L^1$ and the structure of the specific coloring agent compound having the cationic structure represented by Formula (I) described above may be linked to each other at a cationic moiety represented by $X^{103}$ in Formula (I) described above, or may be bonded to an ion part (anionic structure) which is paired with the cationic structure represented by Formula (I) described above.

The coloring agent multimer including the repeating unit represented by Formula (A) can be synthesized by (1) a method of synthesizing a near-infrared absorbing coloring agent having a polymerizable group by addition polymerization, or (2) a method of reacting a polymer having a highly reactive functional group such as an isocyanate group, an acid anhydride group, and an epoxy group with a near-infrared absorbing coloring agent having a functional group reactive with the highly reactive functional group (a hydroxyl group, a primary or secondary amino group, a carboxyl group, or the like).

As the addition polymerization, a known addition polymerization (radical polymerization, anionic polymerization, or cationic polymerization) can be applied, but among these, particularly, radical polymerization is preferable because reaction conditions can be relaxed and a coloring agent skeleton is not decomposed. Known reaction conditions can be applied to the radical polymerization.

From the viewpoint of heat resistance, the coloring agent multimer having the repeating unit represented by Formula (A) is preferably a radical polymer obtained by radical polymerizing a near-infrared absorbing coloring agent having an ethylenically unsaturated bond.

Specific Example

Examples of the coloring agent compound having the cationic structure represented by Formula (I) described above (specific coloring agent compound) include compounds represented by Formulae (001) to (024).

(001)
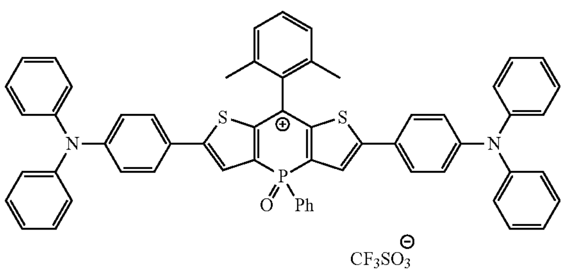
(002)
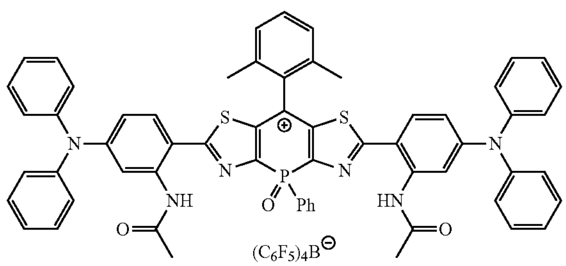
(003)
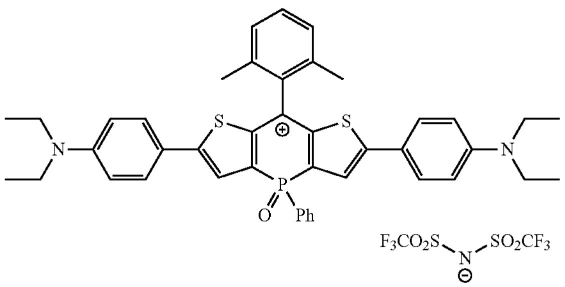
(004)
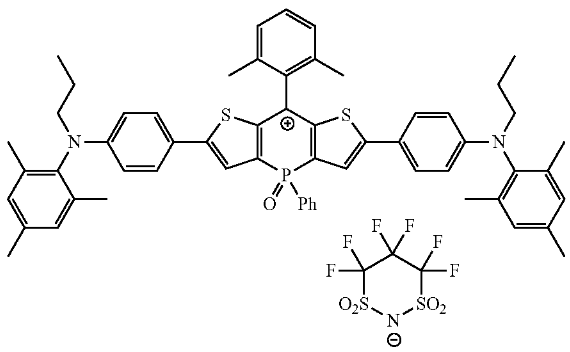
(005)
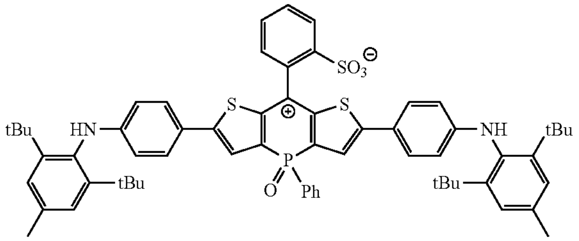
(006)
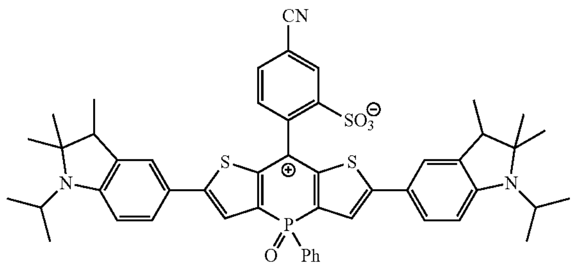
(007)
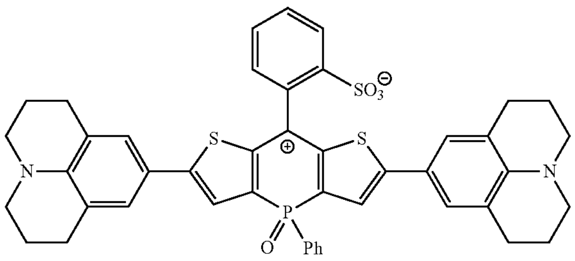
(008)
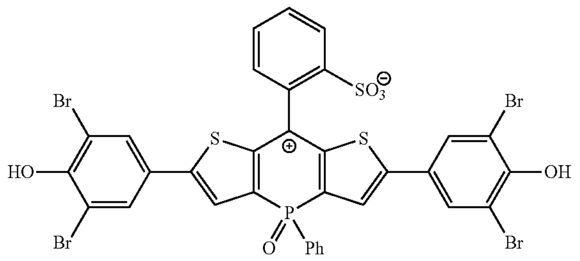
(009)
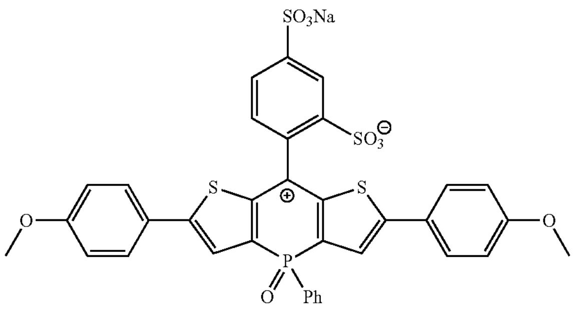
(010)
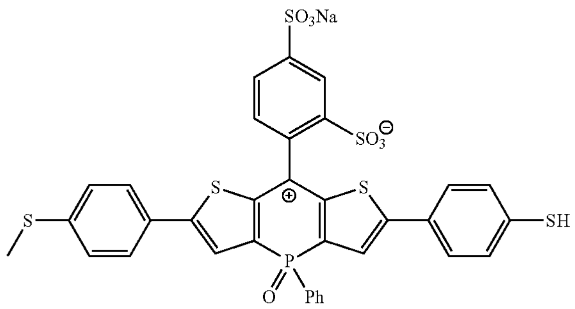

-continued
(011)
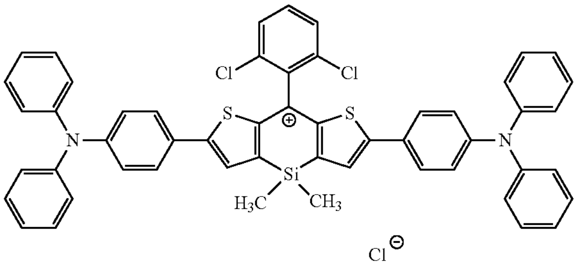
(012)
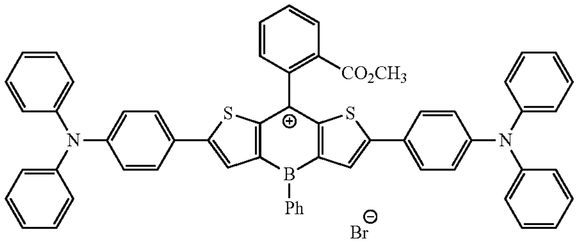
(013)
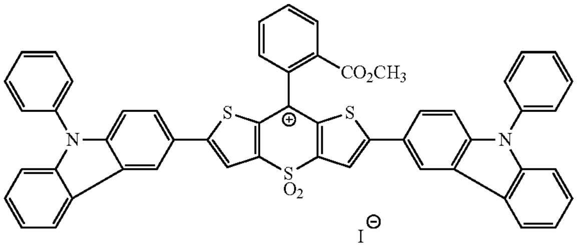
(014)
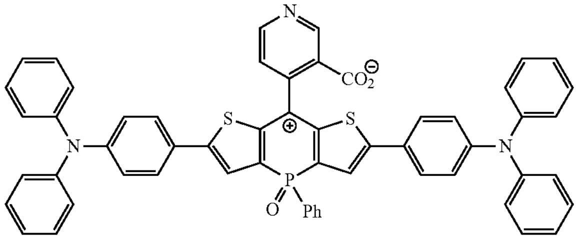
(015)
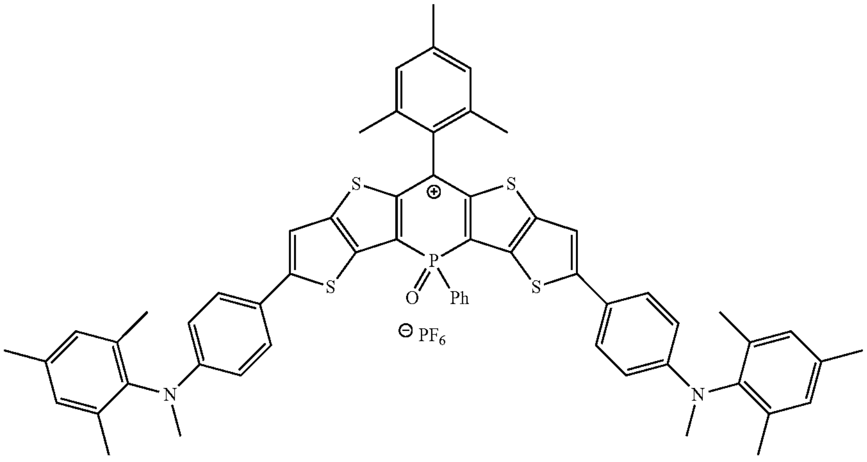
(016)
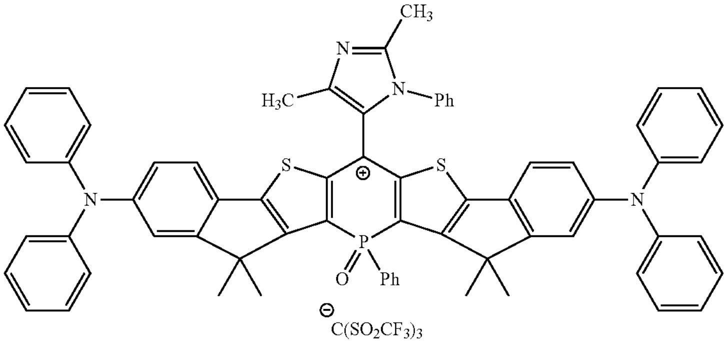

-continued
(017)
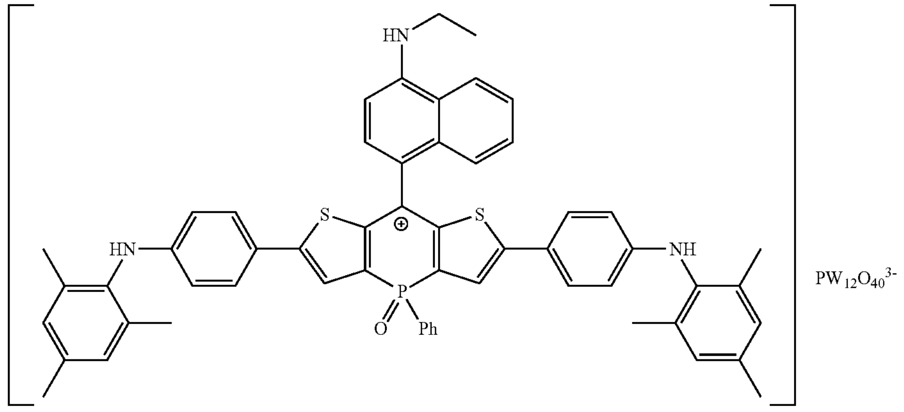
(018)
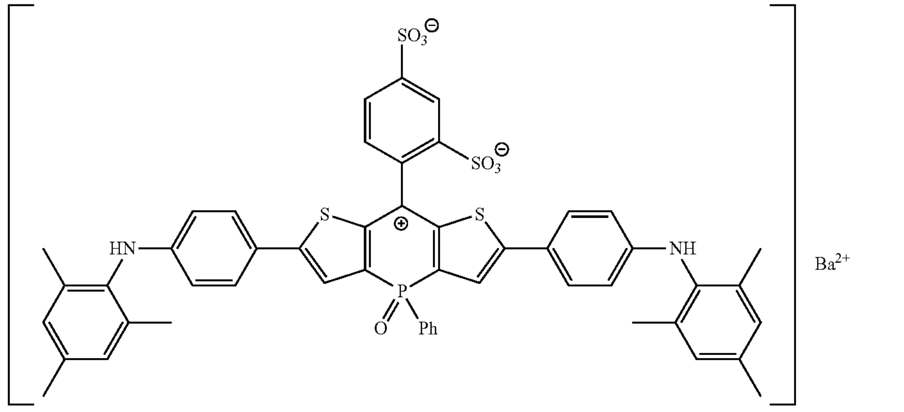
(019)
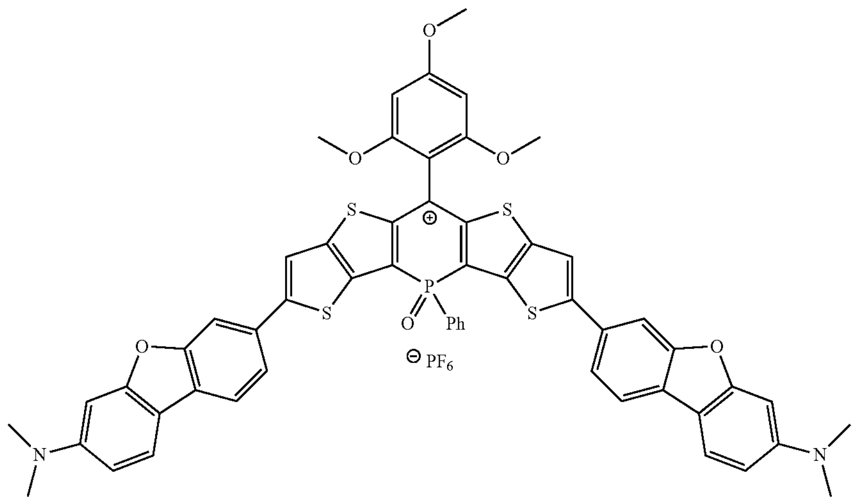

-continued (020)

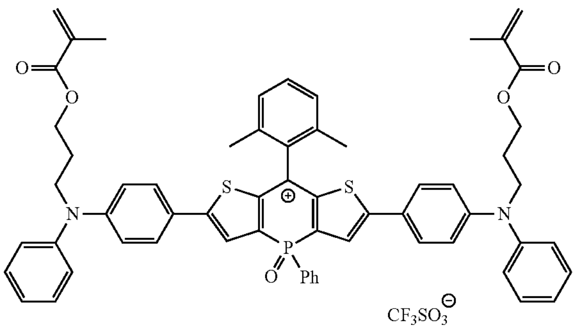

(021)

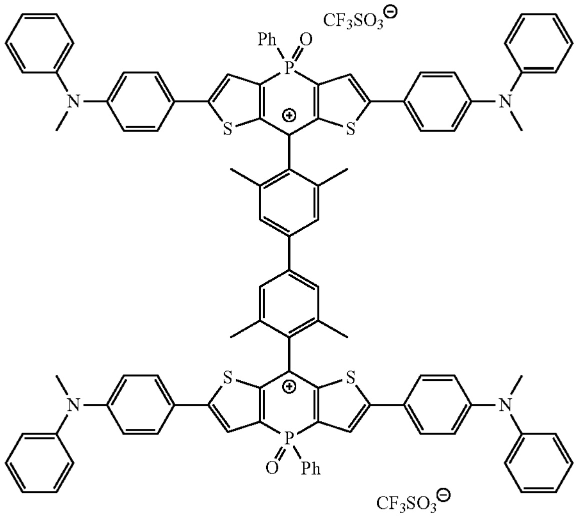

(022)

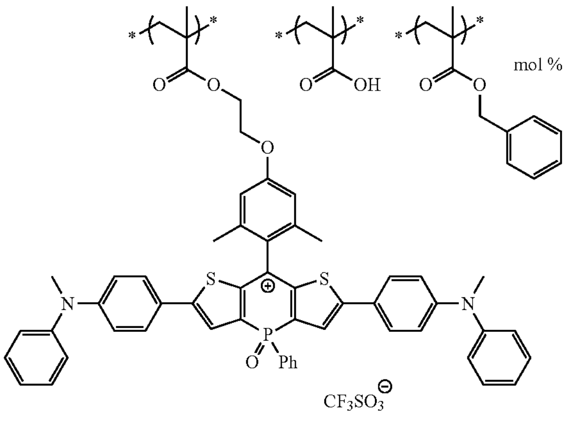

Mw: 11.000
Pd:2.6

(023)

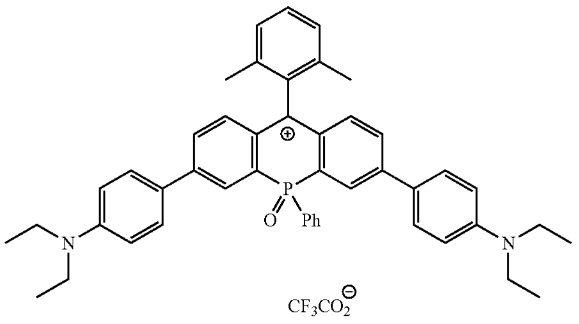

(024)

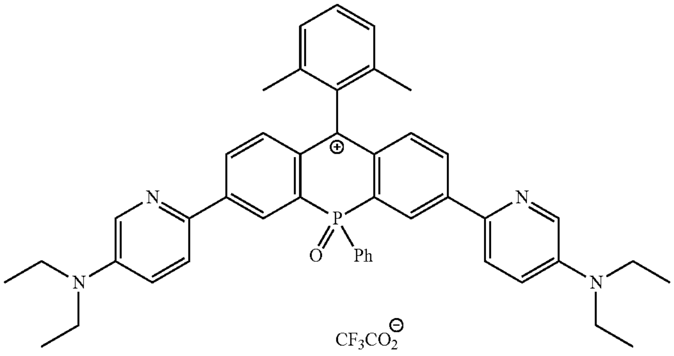

In the present invention, from the reason of achieving both the visible transparency and near-infrared absorbance, it is preferable that the at least one specific compound selected from the group consisting of the coloring agent compound having the cationic structure represented by Formula (I) described above (specific coloring agent compound) and a reduction body thereof has a maximal absorption wavelength in a wavelength range of 700 to 1,800 nm, and it is more preferable to have a maximal absorption wavelength in a wavelength range of 1,000 to 1,600 nm.

Here, as a measuring method of the above-described maximal absorption wavelength, using a solution prepared by dissolving the specific compound (5 to 50 mg) to be measured in a solution (for example, water, methanol, or dimethyl sulfoxide) (1,000 ml) which dissolves the specific compound, an absorption spectrum is measured using a spectrophotometer (MPC-3100 (manufactured by SHI- MADZU Corporation)), and the maximal absorption wavelength is read from the obtained absorption spectrum.

In the present invention, a content of the at least one specific compound selected from the group consisting of the coloring agent compound having the cationic structure represented by Formula (I) described above (specific coloring agent compound) and a reduction body thereof is preferably 1% to 30% by mass, more preferably 2% to 20% by mass, and still more preferably 3% to 15% by mass with respect to the total mass of solid contents of the composition.

In addition, the content of the specific compound is preferably 1 to 30 parts by mass, more preferably 2 to 20 parts by mass, and still more preferably 3 to 15 parts by mass with respect to 100 parts by mass of the liquid crystal compound described below.

[Liquid Crystal Compound]

The liquid crystal compound contained in the composition according to the embodiment of the present invention is not particularly limited, and examples thereof include a compound in which any one of homeotropic alignment, homogeneous alignment, hybrid alignment, or cholesteric alignment can be performed.

Here, in general, the liquid crystal compound can be classified into a rod-like type and a disk-like type according to the shape thereof. Furthermore, each type includes a low-molecular-type and a high-molecular-type. The term high molecular generally refers to a compound having a degree of polymerization of 100 or more (Polymer Physics-Phase Transition Dynamics, written by Masao Doi, p. 2, published by Iwanami Shoten, 1992).

In the present invention, any of the above-described types of liquid crystal compounds can be used, but from the reason that the above-described specific compound can be aligned with a high alignment degree, a rod-like liquid crystal compound or a discotic liquid crystal compound (a disk-like liquid crystal compound) is preferable.

In addition, from the viewpoint of fixing the alignment, the liquid crystal compound is preferably a liquid crystal compound having a polymerizable group (polymerizable liquid crystal compound). Here, examples of the polymerizable group include an acryloyl group, a methacryloyl group, an epoxy group, and a vinyl group. In addition, by polymerizing such a polymerizable liquid crystal compound, the alignment of the liquid crystal compound can be fixed, but it is not necessary to exhibit liquid crystallinity after the liquid crystal compound is immobilized by polymerization.

As the rod-like liquid crystal compound, for example, compounds described in the claim 1 of JP1999-513019A (JP-H11-513019A) or paragraphs [0026] to [0098] of JP2005-289980A are preferable.

As the discotic liquid crystal compound, for example, discotic liquid crystal compounds described in paragraphs [0020] to [0067] of JP2007-108732A or paragraphs [0013] to [0108] of JP2010-244038A are preferable.

Examples of the high-molecular-weight liquid crystal compound include thermotropic liquid crystalline polymers described in JP2011-237513A and high-molecular-weight liquid crystal compounds described in paragraphs [0012] to [0042] of WO2018/199096A.

Examples of the low-molecular-weight liquid crystal compound include liquid crystal compounds described in paragraphs [0072] to [0088] of JP2013-228706A, and among these, a liquid crystal compound exhibiting smectic properties is preferable.

In the present invention, a liquid crystal compound having reverse wavelength dispersibility can be used as the above-described liquid crystal compound.

Here, the liquid crystal compound having "reverse wavelength dispersibility" refers to the fact that in the measurement of an in-plane retardation (Re) value at a specific wavelength (visible light range) of a retardation film produced using the liquid crystal compound, as the measurement wavelength increases, the Re value is the same or increased.

The liquid crystal compound having reverse wavelength dispersibility is not particularly limited as long as a film having reverse wavelength dispersibility can be formed as described above, and examples thereof include compounds represented by Formula (I) described in JP2008-297210A (particularly, compounds described in paragraphs [0034] to [0039]), compounds represented by Formula (1) described in JP2010-084032A (particularly, compounds described in paragraphs [0067] to [0073]), and compounds represented by Formula (I) described in JP2016-081035A (particularly, compounds described in paragraphs [0043] to [0055]).

Examples thereof further include compounds described in paragraphs [0027] to [0100] of JP2011-006360A, paragraphs [0028] to [0125] of JP2011-006361A, paragraphs [0034] to [0298] of JP2012-207765A, paragraphs [0016] to [0345] of JP2012-077055A, paragraphs [0017] to [0072] of WO12/141245A, paragraphs [0021] to [0088] of WO12/147904A, and paragraphs [0028] to [0115] of WO14/147904A.

Examples of such a liquid crystal compound include compounds described in paragraphs [0019] to [0140] of WO2022/014340A, the description of which is incorporated herein by reference.

In the present invention, a content of the liquid crystal compound is preferably 60% to 99% by mass, more preferably 70% to 95% by mass, and still more preferably 75% to 85% by mass with respect to the total mass of solid contents of the composition.

[Solvent]

The composition according to the embodiment of the present invention preferably contains a solvent.

Examples of the solvent include organic solvents such as ketones, ethers, aliphatic hydrocarbons, alicyclic hydrocarbons, aromatic hydrocarbons, carbon halides, esters, alcohols, cellosolves, cellosolve acetates, sulfoxides, amides, and heterocyclic compounds, and water.

These solvents may be used alone or in combination of two or more kinds thereof.

Among these solvents, organic solvents are preferable, and carbon halides or ketones are more preferable.

In a case where the composition according to the embodiment of the present invention contains a solvent, a content of the solvent is preferably 50% to 80% by mass, more preferably 55% to 75% by mass, and still more preferably 60% to 70% by mass with respect to the total mass of the composition.

[Polymerization Initiator]

The composition according to the embodiment of the present invention preferably contains a polymerization initiator.

The polymerization initiator is not particularly limited, but a compound having photosensitivity, that is, a photopolymerization initiator is preferable.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02, manufactured by BASF SE.

The polymerization initiator may be used alone or in combination of two or more kinds thereof.

In a case where the composition according to the embodiment of the present invention contains a polymerization initiator, a content of the polymerization initiator is preferably 0.1% to 10% by mass and more preferably 0.2% to 5% by mass with respect to the total mass of solid contents of the composition.

[Light Shielding Material]

The composition according to the embodiment of the present invention preferably contains a material which shields light in a wavelength range of more than 1,000 nm and 1,800 nm or less.

Examples of the material which shields light in a wavelength range of more than 1,000 nm and 1,800 nm or less include a material which absorbs the light in a wavelength range of more than 1,000 nm and 1,800 nm or less, and a material which shields the light in a wavelength range of more than 1,000 nm and 1,800 nm or less by reflecting the light.

Examples of the material which absorbs the light in a wavelength range of more than 1,000 nm and 1,800 nm or less include a compound having a maximal absorption wavelength in a wavelength range of more than 1,000 nm and 1,600 nm or less. The maximal absorption wavelength of the above-described compound is preferably in a range of 1,030 to 1,750 nm, more preferably in a range of 1,050 to 1,700 nm, and still more preferably in a range of 1,070 to 1,650 nm. In addition, the above-described compound has a ratio of an absorbance Amax at the maximal absorption wavelength to an absorbance (Amax+200) at a wavelength of the maximal absorption wavelength+200 nm, that is, Amax+200/Amax of preferably 4.5 or more, more preferably 10 or more, and still more preferably 30 or more. The upper limit thereof is, for example, preferably 90 or less. According to this aspect, it is possible to design a filter having excellent contrast of transmittance/light shielding of infrared rays.

The composition according to the embodiment of the present invention may contain other components in addition to the components described above.

Examples of the other components include a sensitizer, a wavelength dispersion control agent, an optical properties modifier, a surfactant, an adhesion improver, a slipping agent, an alignment control agent, and an ultraviolet absorber.

[Optically Anisotropic Layer]

The optically anisotropic layer according to a first aspect of the present invention is an optically anisotropic layer which contains the above-described specific compound and the above-described liquid crystal compound.

In addition, the optically anisotropic layer according to a second aspect of the present invention is an optically anisotropic layer in which an alignment state of a composition containing the above-described specific compound and the above-described polymerizable liquid crystal compound is fixed.

A method for producing the optically anisotropic layer according to the first aspect of the present invention is not particularly limited, and the optically anisotropic layer can be produced by a method of applying the composition according to the embodiment of the present invention onto a support.

Here, the support to be used is a member having a function as a base material for applying the composition. The support may be a so-called temporary support.

Examples of the support (temporary support) include a plastic substrate and a glass substrate. Examples of a material constituting the plastic substrate include a polyester resin such as polyethylene terephthalate, a polycarbonate resin, a (meth)acrylic resin, an epoxy resin, a polyurethane resin, a polyamide resin, a polyolefin resin, a cellulose resin, a silicone resin, and polyvinyl alcohol.

A thickness of the support may be approximately 5 to 1,000 μm, preferably 10 to 250 μm and more preferably 15 to 90 μm.

As necessary, an alignment film may be disposed on the support.

The alignment film generally contains a polymer as a main component. The polymer for the alignment film is described in a large number of documents, and a large number of commercially available polymer products are available. The polymer for the alignment film is preferably a polyvinyl alcohol, a polyimide, a derivative thereof, an azo derivative, or a cinnamoyl derivative.

It is preferable that the alignment film is subjected to a known rubbing treatment.

In addition, a photo-alignment film may be used as the alignment film.

A thickness of the alignment film is preferably 0.01 to 10 μm and more preferably 0.01 to 1 μm.

The application method may be, for example, a known method, examples thereof include a curtain coating method, an extrusion coating method, a roll coating method, a dip coating method, a spin coating method, a print coating method, a spray coating method, and a slide coating method.

In addition, a method for producing the optically anisotropic layer according to the second aspect of the present invention is not particularly limited, and the optically anisotropic layer can be produced by a method of performing an alignment treatment on a coating film formed of the composition according to the embodiment of the present invention (for example, the optically anisotropic layer according to the first aspect of the present invention described above) to fix an alignment state.

The alignment treatment is a step of aligning liquid crystal components contained in the composition according to the embodiment of the present invention.

The alignment treatment may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

It is preferable that the alignment treatment includes a heat treatment.

From the viewpoint of manufacturing suitability, the heat treatment is performed at a temperature of preferably 10° C. to 250° C. and more preferably 25° C. to 190° C. In addition, the heating time is preferably 1 to 300 seconds and more preferably 1 to 120 seconds.

The alignment treatment may include a cooling treatment performed after the heat treatment. The cooling treatment is a treatment of cooling the heated coating film to room temperature (20° C. to 25° C.).

The alignment treatment may include a curing treatment performed after the heat treatment.

The curing treatment is performed by, for example, heating the film and/or irradiating (exposing) the formed product with light. Among these, it is preferable that the curing step is performed by irradiating the light absorption anisotropic layer with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In addition, the exposure may be performed under a nitrogen atmosphere. In a case where the curing of the light absorption anisotropic layer proceeds by radical polymerization, since inhibition of polymerization by oxygen is reduced, it is preferable that the exposure is performed in a nitrogen atmosphere.

[Liquid Crystal Cell]

The liquid crystal cell according to the embodiment of the present invention is a liquid crystal cell including a pair of electrodes and a liquid crystal layer formed of the above-described composition according to the embodiment of the present invention (for example, the first optically anisotropic layer according to the embodiment of the present invention described above), provided between the electrodes.

Here, the electrodes and any substrate, spacer, and the like in the liquid crystal cell can adopt a known configuration in the related art.

[Applications]

The optically anisotropic layer according to the first aspect and the second aspect of the present invention (hereinafter, abbreviated as "optically anisotropic layer according to the embodiment of the present invention") can be applied to various applications.

For example, the optically anisotropic layer according to the embodiment of the present invention can be used as a polarizer. In particular, the optically anisotropic layer according to the embodiment of the present invention can be used as a polarizer for infrared rays, which can absorb light having a wavelength of 1,000 to 1,700 nm.

In addition, the optically anisotropic layer according to the embodiment of the present invention may be used in combination with other members.

For example, a protective film may be disposed on one surface or both surfaces of the optically anisotropic layer according to the embodiment of the present invention. In a case where the protective film is disposed, it may be disposed through an adhesive or a pressure sensitive adhesive.

Examples of the protective film include a triacetyl cellulose film, an acrylic film, a polycarbonate film, and a cycloolefin film. As the protective film, a film which is transparent, has a small amount of birefringence, and hardly causes a phase difference is preferable.

In addition, the optically anisotropic layer according to the embodiment of the present invention may be combined with other layers such as a hardcoat layer, an antiglare layer, and an antireflection layer. These other layers may be disposed through an adhesive or a pressure sensitive adhesive.

The optically anisotropic layer according to the embodiment of the present invention can also be used by being bonded to an inorganic substrate such as a prism and glass, or a plastic plate. In a case where the inorganic substrate or the plastic substrate has a curved surface, a curved surface can also be formed by bonding the optically anisotropic layer according to the embodiment of the present invention to the curved surface.

The optically anisotropic layer according to the embodiment of the present invention may be combined with various functional layers for improving a viewing angle, various functional layers for improving contrast, a layer having brightness improving properties, and the like.

Examples of the above-described various functional layers include a layer which controls a phase difference.

The optically anisotropic layer according to the embodiment of the present invention, which is combined with such various functional layers, can be applied to various display devices such as a liquid crystal display device.

In addition to the above, the optically anisotropic layer according to the embodiment of the present invention can be applied to liquid crystal projectors, calculators, clocks, laptops, word processors, liquid crystal televisions, polarized lenses, polarized glasses, car navigation systems, sensors, lenses, switching elements, isolators, cameras, indoor and outdoor measuring instruments, and displays for cars.

Among these, the optically anisotropic layer according to the embodiment of the present invention is suitably applied to a sensor, a lens, a switching element, an isolator, and a camera.

In addition, the optically anisotropic layer according to the embodiment of the present invention may be combined with an infrared light source. That is, the present invention also relates to a device including the optically anisotropic layer according to the embodiment of the present invention and an infrared light source. Examples of such a device include a distance measurement device such as Light Detection and Ranging (LIDAR)

EXAMPLES

Hereinafter, the present invention will be described in more detail with reference to Examples. The materials, amounts used, proportions, treatment contents, treatment procedures, and the like shown in the following examples can be modified as appropriate in the range of not departing from the spirit of the present invention. Therefore, the scope of the present invention should not be construed as being limited to Examples.

Example 1

[Preparation of Coloring Agent-Containing Polymerizable Liquid Crystal Composition 1]

A coloring agent-containing polymerizable liquid crystal composition 1 having the following formulation was prepared, filtered through a polypropylene filter having a pore diameter of 0.2 μm, and used as a coating liquid.

| Coloring agent-containing polymerizable liquid crystal composition 1 | |
|---|---|
| Coloring agent (025) shown below | 10 parts by mass |
| Rod-like liquid crystal compound (A) shown below | 80 parts by mass |
| Rod-like liquid crystal compound (B) shown below | 20 parts by mass |
| Photopolymerization initiator (IRGACURE 907, manufactured by BASF Japan) | 3 parts by mass |
| Sensitizer (KAYACURE DETX, manufactured by Nippon Kayaku Co., Ltd.) | 1 part by mass |
| Fluorine-based polymer (FP4) shown below | 0.3 parts by mass |
| Methyl ethyl ketone (MEK) | 193 parts by mass |
| Cyclohexanone | 50 parts by mass |

Coloring Agent (025) [Maximal Absorption Wavelength: 1,161 nm]

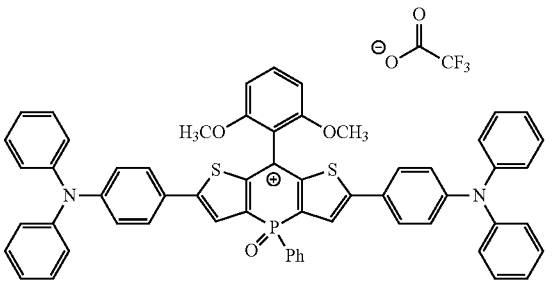 [SMILES: O=C([O-])C(F)(F)F ; COc1cccc(OC)c1[C+]1c2sc(-c3ccc(N(c4ccccc4)c4ccccc4)cc3)cc2P(=O)(c2ccccc2)c2cc(-c3ccc(N(c4ccccc4)c4ccccc4)cc3)sc21]

| Formulation of coating liquid for forming alignment film 1 | |
|---|---|
| Modified polyvinyl alcohol shown below | 2.4 parts by mass |
| Isopropyl alcohol | 1.6 parts by mass |
| Methanol | 36 parts by mass |
| Water | 60 parts by mass |

Modified Polyvinyl Alcohol

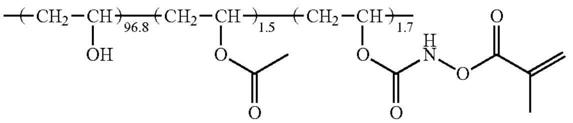

Rod-Like Liquid Crystal Compound (A)

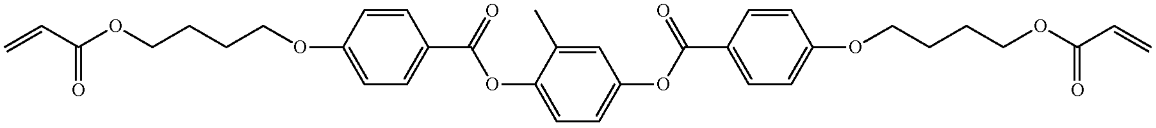 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound (B)

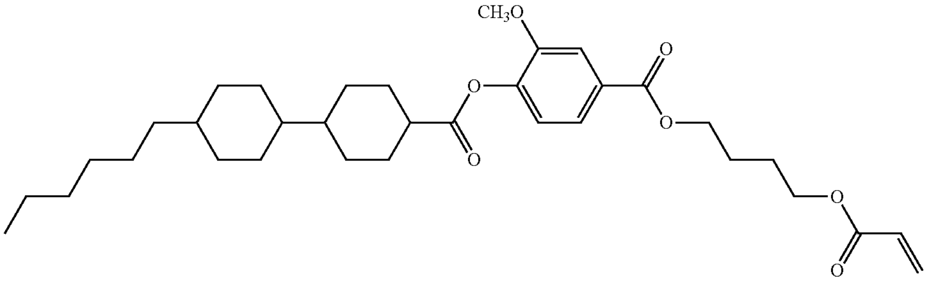

Fluorine-Based Polymer (FP4) [Weight-Average Molecular Weight. 12,000]

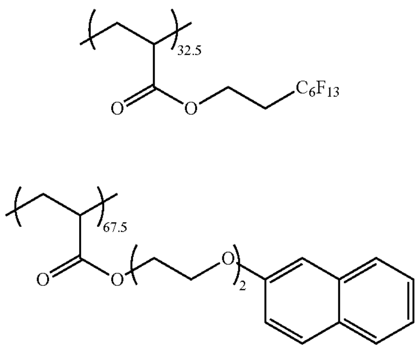

[Production of Infrared Polarizing Film 1]

A coating liquid for forming an alignment film 1, having the following formulation, was continuously applied onto a glass substrate using a #8 wire bar. The coating liquid was dried for 60 seconds by hot air at 60° C., and further dried for 120 seconds by hot air at 100° C. to form an alignment film 1. A thickness of the alignment film 1 was 0.5 μm.

A surface of the alignment film 1 disposed on the glass substrate was subjected to a rubbing treatment. The above-described coloring agent-containing polymerizable liquid crystal composition 1 was applied onto the rubbing-treated surface using a bar coater.

Next, the composition was heat-aged at a film surface temperature of 100° C. for 60 seconds for alignment in a nematic phase, cooled to 70° C., and irradiated with 1,000 $mJ/cm^2$ of ultraviolet rays using an air-cooled metal halide lamp (manufactured by Eye Graphics Co., Ltd.) at 70 $mW/cm^2$ in air to fix an alignment state, thereby forming an infrared polarizing film 1 including an optically anisotropic layer. A thickness of the infrared polarizing film 1 was 3.0 μm.

Example 2

[Preparation of Coloring Agent-Containing Polymerizable Liquid Crystal Composition 2]

A composition was prepared in the same manner as in Example 1, except that the coloring agent (025) in the coloring agent-containing polymerizable liquid crystal composition used in Example 1 was changed to the following coloring agent (026), filtered through a polypropylene filter having a pore diameter of 0.2 μm, and used as a coloring agent-containing polymerizable liquid crystal composition 2.

Coloring Agent (026) [Maximal Absorption Wavelength: 1,162 nm]

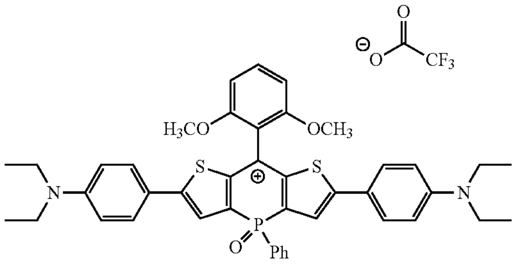 [SMILES: O=C([O-])C(F)(F)F ; CCN(CC)c1ccc(-c2cc3c(s2)[C+](c2c(OC)cccc2OC)c2sc(-c4ccc(N(CC)CC)cc4)cc2P3(=O)c2ccccc2)cc1]

[Production of Infrared Polarizing Film 2]

An infrared polarizing film 2 was produced according to the same production procedure as in the infrared polarizing film 1, except that the coloring agent-containing polymerizable liquid crystal composition 2 was used instead of the coloring agent-containing polymerizable liquid crystal composition 1.

Example 3

[Preparation of Coloring Agent-Containing Polymerizable Liquid Crystal Composition 3]

A composition was prepared in the same manner as in Example 1, except that the coloring agent (025) in the coloring agent-containing polymerizable liquid crystal composition used in Example 1 was changed to the following coloring agent (027), filtered through a polypropylene filter having a pore diameter of 0.2 μm, and used as a coloring agent-containing polymerizable liquid crystal composition 3.

Coloring Agent (027) [Maximal Absorption Wavelength: 1,170 nm]

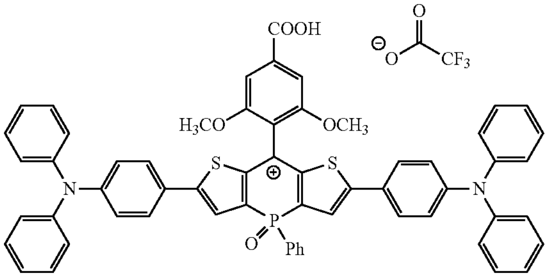 [SMILES: COc1cc(C(=O)O)cc(OC)c1[C+]1c2sc(-c3ccc(N(c4ccccc4)c4ccccc4)cc3)cc2P(=O)(c2ccccc2)c2cc(-c3ccc(N(c4ccccc4)c4ccccc4)cc3)sc21 ; O=C([O-])C(F)(F)F]

[Production of Infrared Polarizing Film 3]

An infrared polarizing film 3 was produced according to the same production procedure as in the infrared polarizing film 1, except that the coloring agent-containing polymerizable liquid crystal composition 3 was used instead of the coloring agent-containing polymerizable liquid crystal composition 1.

Example 4

[Preparation of Coloring Agent-Containing Polymerizable Liquid Crystal Composition 4]

A coloring agent-containing polymerizable liquid crystal composition 4 having the following formulation was prepared, filtered through a polypropylene filter having a pore diameter of 0.2 μm, and used as a coloring liquid.

| Coloring agent-containing polymerizable liquid crystal composition 4 | |
|---|---|
| Coloring agent (026) described above [maximal absorption wavelength: 1,162 nm] | 10 parts by mass |
| Rod-like liquid crystal compound (1-6) shown below | 100 parts by mass |
| Photopolymerization initiator (IRGACURE 369, manufactured by BASF Japan) | 6 parts by mass |
| Photopolymerization initiator (isopropylthioxantone, manufactured by DKSH Holding Ltd.) | 2 parts by mass |
| Leveling agent (BYK-361N, manufactured by BYK-Chemie) | 1.2 parts by mass |
| Cyclopentanone | 250 parts by mass |

Rod-Like Liquid Crystal Compound (1-6)

(1-6)

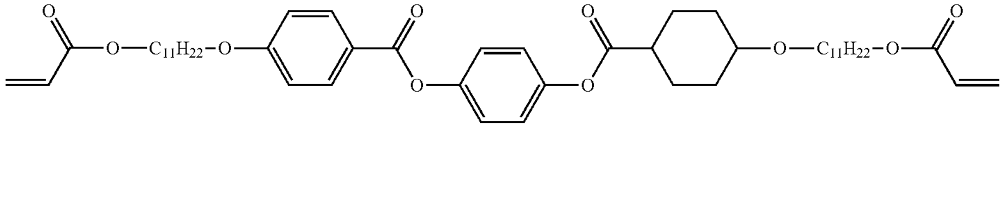

[Production of Infrared Polarizing Film 4]

A surface of the above-described alignment film 1 disposed on the glass substrate was subjected to a rubbing treatment. The above-described coloring agent-containing polymerizable liquid crystal composition 4 was applied onto the rubbing-treated surface using a bar coater.

Next, the composition was heat-aged at a film surface temperature of 120° C. for 60 seconds for alignment in a nematic phase, cooled to 70° C. for alignment in a smectic phase, and irradiated with 1,000 mJ/$cm^2$ of ultraviolet rays using an air-cooled metal halide lamp (manufactured by Eye Graphics Co., Ltd.) at 70 mW/$cm^2$ in air to fix an alignment state, thereby forming an infrared polarizing film 4 including an optically anisotropic layer. A thickness of the infrared polarizing film 4 was 3.0 μm.

Example 5

[Preparation of Coloring Agent-Containing Polymerizable Liquid Crystal Composition 5]

A coloring agent-containing polymerizable liquid crystal composition 5 having the following formulation was prepared, filtered through a polypropylene filter having a pore diameter of 0.2 μm, and used as a coating liquid.

| Coloring agent-containing polymerizable liquid crystal composition 5 | |
|---|---|
| Coloring agent (026) described above [maximal absorption wavelength: 1,162 nm] | 1.2 parts by mass |
| High-molecular-weight liquid crystal compound (L1) shown below | 4.7 parts by mass |
| Photopolymerization initiator (IRGACURE 819, manufactured by BASF Japan) | 0.054 parts by mass |
| Fluorine-based polymer (F1) shown below | 0.060 parts by mass |
| Cyclopentanone | 47 parts by mass |
| Tetrahydrofuran | 47 parts by mass |

High-Molecular-Weight Liquid Crystal Compound (L1)

L1

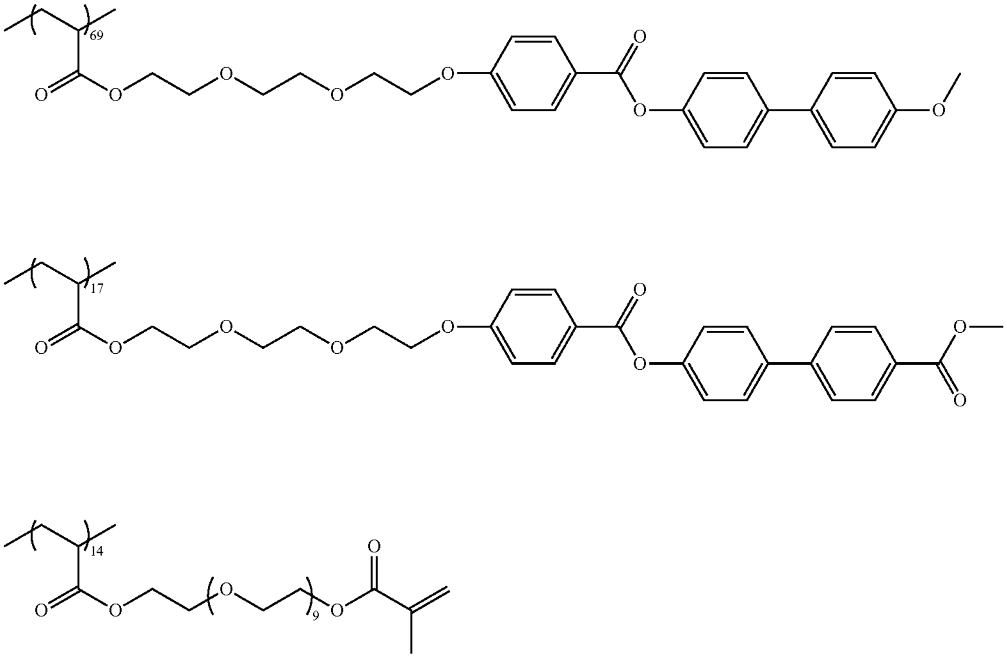

Fluorine-Based Polymer (F1)

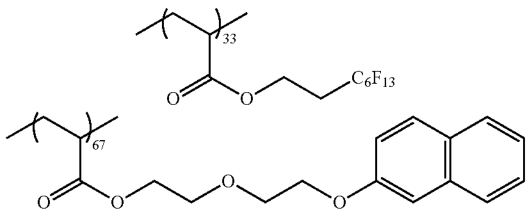

[Production of Infrared Polarizing Film 5]

A surface of the above-described alignment film 1 disposed on the glass substrate was subjected to a rubbing treatment. The above-described coloring agent-containing polymerizable liquid crystal composition 5 was applied onto the rubbing-treated surface using a bar coater.

Next, the coating film 1 was heated at 140° C. for 40 seconds and cooled to room temperature (23° C.).

Next, the coating film was heated at 85° C. for 10 seconds and cooled to room temperature again.

Next, the composition was irradiated with 1,000 mJ/cm$^2$ of ultraviolet rays using an air-cooled metal halide lamp (manufactured by Eye Graphics Co., Ltd.) at 70 mW/cm$^2$ in air to fix an alignment state, thereby forming an infrared polarizing film 5 including an optically anisotropic layer. A thickness of the infrared polarizing film 5 was 3.0 μm.

Example 6

[Preparation of Coloring Agent-Containing Polymerizable Liquid Crystal Composition 6]

A coloring agent-containing polymerizable liquid crystal composition 6 having the following formulation was prepared, filtered through a polypropylene filter having a pore diameter of 0.2 μm, and used as a coating liquid.

| Coloring agent-containing polymerizable liquid crystal composition 6 | |
|---|---|
| Coloring agent (025) described above [maximal absorption wavelength: 1,161 nm] | 10 parts by mass |
| Discotic liquid crystal compound (A) shown below | 80 parts by mass |
| Discotic liquid crystal compound (B) shown below | 20 parts by mass |
| Ethylene oxide-modified trimethylolpropane triacrylate (V#360, manufactured by Osaka Organic Chemical Industry Ltd.) | 10 parts by mass |
| Photopolymerization initiator (IRGACURE 907, manufactured by Chiba Japan Co., Ltd.) | 3 parts by mass |
| Pyridinium salt (A) shown below | 0.9 parts by mass |
| Boronic acid-containing compound shown below | 0.08 parts by mass |
| Fluorine-based polymer (FP1) shown below | 0.3 parts by mass |
| Methyl ethyl ketone | 220 parts by mass |

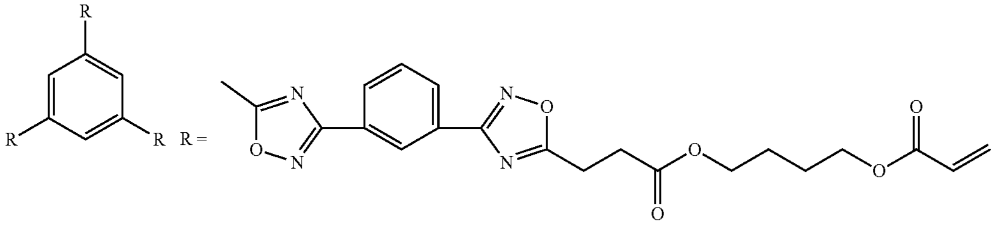

Discotic liquid crystal compound (A)

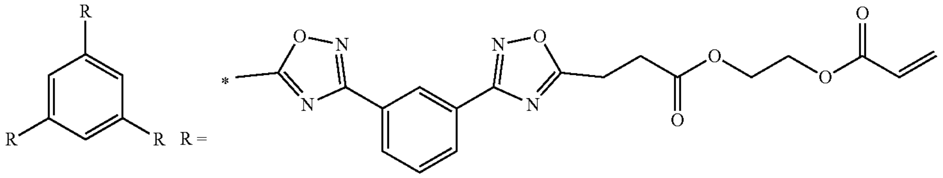

Discotic liquid crystal compound (B)

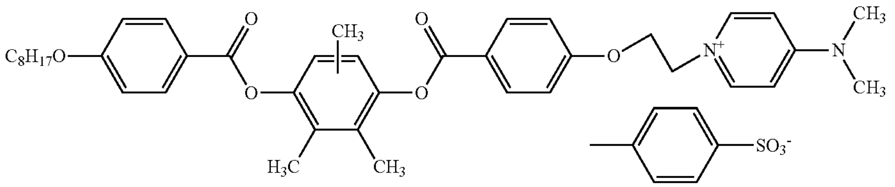

Pyridinium salt (A)

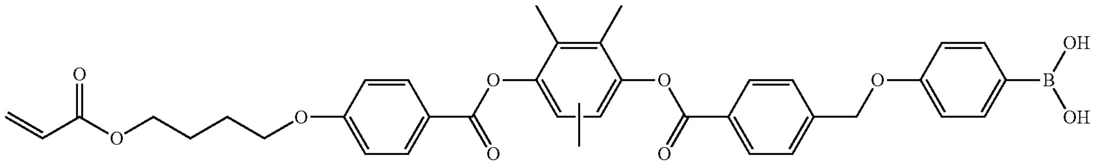

Boronic acid-containing compound

-continued

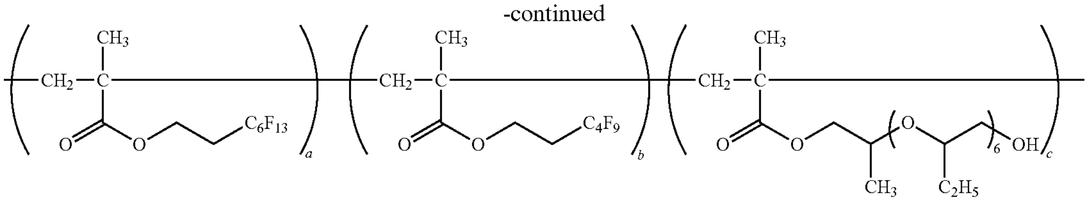

a/b/c = 20/20/60 wt %

Mw = 16000

Fluorine-based polymer (FP1)

[Production of Infrared Polarizing Film 6]

A surface of the above-described alignment film 1 disposed on the glass substrate was subjected to a rubbing treatment. The above-described coloring agent-containing polymerizable liquid crystal composition 6 was applied onto the rubbing-treated surface using a bar coater.

Next, the composition was heat-aged at a film surface temperature of 100° C. for 60 seconds for alignment in a nematic phase, cooled to 70° C., and irradiated with 1,000 $mJ/cm^2$ of ultraviolet rays using an air-cooled metal halide lamp (manufactured by Eye Graphics Co., Ltd.) at 70 $mW/cm^2$ in air to fix an alignment state, thereby producing an infrared polarizing film 6 including an optically anisotropic layer.

Example 7

[Preparation of Coloring Agent-Containing Polymerizable Liquid Crystal Composition 7]

A coloring agent-containing polymerizable liquid crystal composition 7 having the following formulation was prepared, filtered through a polypropylene filter having a pore diameter of 0.2 μm, and used as a coating liquid.

| Coloring agent-containing polymerizable liquid crystal composition 7 | |
|---|---|
| Coloring agent (025) described above [maximal absorption wavelength: 1,161 nm] | 10 parts by mass |
| Rod-like liquid crystal compound (L-1) shown below | 60 parts by mass |
| Rod-like liquid crystal compound (L-2) shown below | 40 parts by mass |
| Photopolymerization initiator (IRGACURE OXE01, manufactured by BASF SE) | 3 parts by mass |
| Photopolymerization initiator (IRGACURE 184, manufactured by BASF SE) | 3 parts by mass |
| Fluorine-based polymer (F-1) shown below | 0.2 parts by mass |
| Cyclopentanone | 227 parts by mass |

Rod-Like Liquid Crystal Compound (L-1)

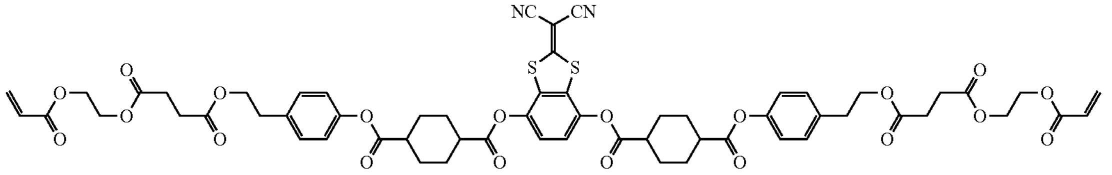 [SMILES: C=CC(=O)OCCOC(=O)CCC(=O)OCCc1ccc(OC(=O)C2CCC(C(=O)Oc3cc(C)c(OC(=O)C4CCC(C(=O)Oc5ccc(CCOC(=O)CCC(=O)OCCOC(=O)C=C)cc5)CC4)c4c3SC(=C(C#N)C#N)S4)CC2)cc1]

Rod-Like Liquid Crystal Compound (L-2)

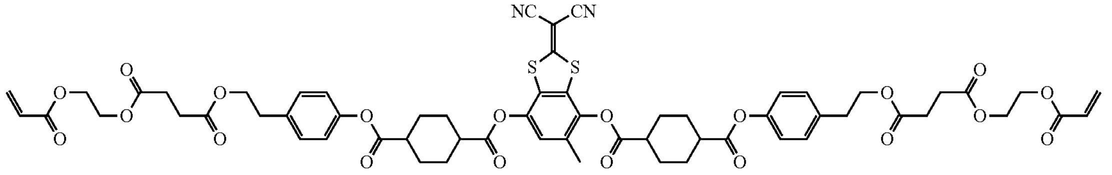

Fluorine-Based Polymer (F-1)

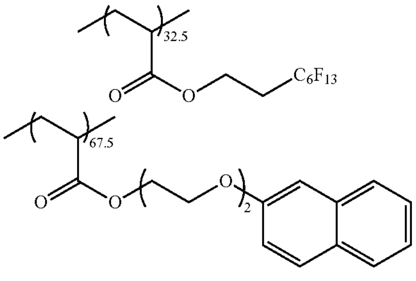

[Production of Infrared Polarizing Film 7]

A surface of the above-described alignment film 1 disposed on the glass substrate was subjected to a rubbing treatment. The above-described coloring agent-containing polymerizable liquid crystal composition 7 was applied onto the rubbing-treated surface using a bar coater.

Next, the composition was heat-aged at a film surface temperature of 100° C. for 60 seconds for alignment in a nematic phase, cooled to 60° C., and irradiated with 1,000 mJ/cm$^2$ of ultraviolet rays using an air-cooled metal halide lamp (manufactured by Eye Graphics Co., Ltd.) at 70 mW/cm$^2$ in air to fix an alignment state, thereby producing an infrared polarizing film 7 including an optically anisotropic layer.

Example 8

[Production of Electron Reduction Body-Containing Polymerizable Liquid Crystal Composition 8]

A composition was prepared in the same manner as in Example 1, except that the coloring agent (025) in the coloring agent-containing polymerizable liquid crystal composition used in Example 1 was changed to the following coloring agent (028) which was subjected to one-electron reduction by a method described in Example 3 of WO2021/176755A, filtered through a polypropylene filter having a pore diameter of 0.2 μm, and used as a coloring agent-containing polymerizable liquid crystal composition 8.

Coloring Agent (028) [Maximal Absorption Wavelength: 555 nm and 880 nm]

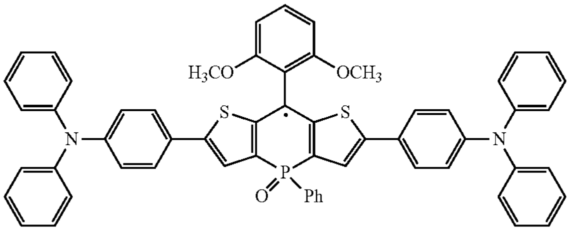

[Production of Infrared Polarizing Film 8]

<Synthesis of Monomer mA-1>

4-aminocyclohexanol (50.0 g), triethylamine (48.3 g), and N,N-dimethylacetamide (800 g) were weighed in a 2 L three-neck flask including a stirring blade, a thermometer, a dropping funnel, and a reflux pipe, and stirred under ice cooling.

Next, methacrylic acid chloride (47.5 g) was added dropwise to the above-described flask over 40 minutes using the dropping funnel, and after completion of the dropwise addition, the reaction solution was stirred at 40° C. for 2 hours.

The reaction solution was cooled to room temperature (23° C.), and subjected to suction filtration to remove the precipitated salt. The obtained organic layer was transferred to a 2 L three-neck flask including a stirring blade, a thermometer, a dropping funnel, and a reflux pipe, and stirred under water cooling.

Next, N,N-dimethylaminopyridine (10.6 g) and triethylamine (65.9 g) were added to the flask, 4-n-octyloxy cinnamic acid chloride (127.9 g) dissolved previously in tetrahydrofuran (125 g) was added dropwise to the flask using the dropping funnel over 30 minutes, and after completion of the dropwise addition, the reaction solution was stirred at 50° C. for 6 hours. The reaction solution was cooled to room temperature, separation and washing were performed with water, the obtained organic layer was dried with anhydrous magnesium sulfate, and the obtained solution was concentrated to obtain a yellowish white solid.

The obtained yellowish white solid was dissolved in methyl ethyl ketone (400 g) by heating, and recrystallized to obtain 76 g of a monomer mA-1 shown below, as a white solid (yield: 40%).

mA-1

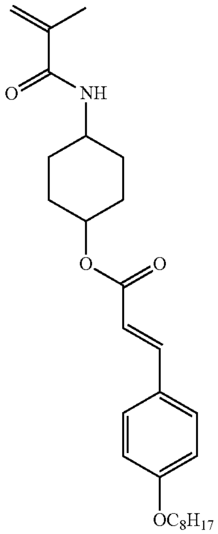

<Other Monomers>

As the following monomer mB-1 forming a repeating unit B-1, CYCLOMER M-100 (manufactured by Daicel Corporation) was used.

mB-1

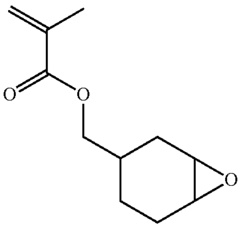

<Synthesis of Polymer P-1>

A flask including a cooling pipe, a thermometer, and a stirrer was charged with 2-butanone (5 parts by mass) as a solvent, and while flowing nitrogen in the flask at 5 mL/min, the solvent was refluxed by heating in a water bath. A solution obtained by mixing the monomer mA-1 (1.2 parts by mass), the monomer mB-1 (8.8 parts by mass), 2,2'-azobis(isobutyronitrile) (1 part by mass) as a polymerization initiator, and 2-butanone (5 parts by mass) as a solvent was added dropwise thereto over 3 hours, and the obtained reaction solution was stirred while maintaining the refluxing state for 3 hours. After completion of the reaction, the reaction solution was allowed to cool to room temperature, and 2-butanone (30 parts by mass) was added to the reaction solution for dilution to obtain a polymer solution having a polymer concentration of approximately 20% by mass. The obtained polymer solution was poured into a large excess of methanol to precipitate the polymer, the precipitate was separated by filtration, and the obtained solid content was washed with a large amount of methanol, and then subjected to blast drying at 50° C. for 12 hours, thereby obtaining a polymer P-1 having a photo-aligned group.

A coating liquid for forming a photo-alignment film 8, having the following formulation, was continuously applied onto a glass substrate using a wire bar. The solvent was removed by drying at 140° C. for 1 minute to form a precursor film having a thickness of 0.3 μm. The obtained precursor film was irradiated with polarized ultraviolet rays (8 mJ/$cm^2$, using an ultra-high pressure mercury lamp) to form a photo-alignment film 8.

| Composition 8 for forming photo-alignment film | |
|---|---|
| Polymer P-1 described above | 100.00 parts by mass |
| Thermal acid generator D-1 shown below | 3.00 parts by mass |
| Diisopropylethylamine | 0.60 parts by mass |
| Butyl acetate | 953.12 parts by mass |
| Methyl ethyl ketone | 238.28 parts by mass |

Thermal Acid Generator D-1

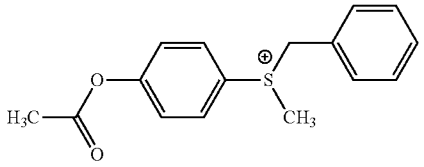

-continued

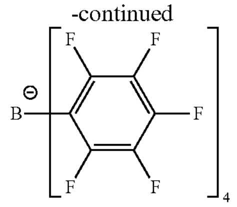

The above-described coloring agent-containing polymerizable liquid crystal composition 8 was applied onto the photo-aligned surface using a bar coater. Next, the composition was heat-aged at a film surface temperature of 100° C. for 60 seconds for alignment in a nematic phase, cooled to 70° C., and irradiated with 1,000 mJ/$cm^2$ of ultraviolet rays using an air-cooled metal halide lamp (manufactured by Eye Graphics Co., Ltd.) at 70 mW/$cm^2$ in air to fix an alignment state, thereby forming an infrared polarizing film 8 including an optically anisotropic layer. A thickness of the infrared polarizing film 8 was 3.0 μm.

Comparative Example 1

An infrared film 11 was produced by the same procedure as in Example 1, except that the rod-like liquid crystal compound (A) and the rod-like liquid crystal compound (B) were not used.

Comparative Example 2

An infrared film 12 was produced by the same procedure as in Example 8, except that the rod-like liquid crystal compound (A) and the rod-like liquid crystal compound (B) were not used.

Comparative Example 3

An infrared polarizing film 13 was produced by the same procedure as in Example 7, except that, instead of the coloring agent (025), the following infrared absorbing coloring agent IR-1 described in Examples of WO2019/044859A was used.

Infrared Absorbing Coloring Agent IR-1 [Maximal Absorption Wavelength: 780 nm]

IR-1

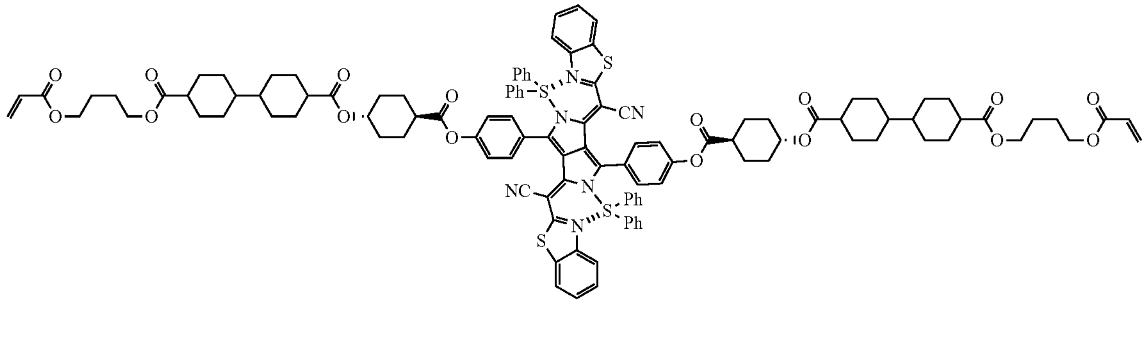

[Evaluation of Absorption Anisotropy of Infrared Polarizing Film]

Absorption anisotropy of the infrared polarizing film produced in Examples 1 to 8 and Comparative Examples 1 to 3 in an infrared region was determined by measuring absorption and an alignment order degree S0 at a maximal absorption wavelength in the infrared region, using a spectrophotometer (MPC-3100 (manufactured by SHagADZU Corporation)) including an infrared polarizer.

The alignment order degree S0 at the maximal absorption wavelength in the infrared region is indicated by a plus in a case where the absorption in a direction orthogonal to ae fast axis of the infrared polarizing film is larger than the absorption in a direction orthogonal to a slow axis; and is indicated by a minus in a case where the absorption in a direction parallel to the fast axis of the infrared polarizing film is larger than the absorption in a direction parallel to the slow axis.

The results are shown in Table 1.

TABLE 1

| | Thickness (μm) | Coloring agent compound | Liquid crystal compound | Maximal absorption wavelength (nm) | Alignment order degree S0 |
|---|---|---|---|---|---|
| Example 1 | 3 | Coloring agent (025) | Rod-like liquid crystal compound (A) Rod-like liquid crystal compound (B) | 1161 | 0.52 |
| Example 2 | 3 | Coloring agent (026) | Rod-like liquid crystal compound (A) Rod-like liquid crystal compound (B) | 1162 | 0.74 |
| Example 3 | 3 | Coloring agent (027) | Rod-like liquid crystal compound (A) Rod-like liquid crystal compound (B) | 1170 | 0.52 |
| Example 4 | 3 | Coloring agent (026) | Rod-like liquid crystal compound (1-6) | 1162 | 0.88 |
| Example 5 | 3 | Coloring agent (026) | High-molecular-weight liquid crystal compound (L1) | 1162 | 0.90 |
| Example 6 | 3 | Coloring agent (025) | Discotic liquid crystal compound (A) Discotic liquid crystal compound (B) | 1161 | 0.55 |
| Example 7 | 3 | Coloring agent (025) | Rod-like liquid crystal compound (L-1) Rod-like liquid crystal compound (L-2) | 1161 | 0.50 |
| Example 8 | 3 | Coloring agent (028) | Rod-like liquid crystal compound (A) Rod-like liquid crystal compound (B) | 880 | 0.59 |
| Comparative Example 1 | 3 | Coloring agent (025) | — | 1161 | 0 (not aligned) |
| Comparative Example 2 | 3 | Coloring agent (028) | — | 880 | 0 (not aligned) |
| Comparative Example 3 | 3 | Coloring agent (IR-1) | Rod-like liquid crystal compound (A) Rod-like liquid crystal compound (B) | 780 | −0.25 |

As shown in Table 1, in a case where the liquid crystal compound was not used, it was found that the coloring agent compound was not aligned and the absorption anisotropy was deteriorated (Comparative Examples 1 and 2).

In addition, in a case where the coloring agent compound having no cationic structure represented by Formula (I) described above was used, it was found that the coloring agent compound had no maximal absorption wavelength in the infrared region (particularly, a wavelength of 1,000 to 1,700 nm) and the absorption anisotropy was deteriorated (Comparative Example 3).

On the other hand, it was found that, in a case of using a composition containing at least one specific compound selected from the group consisting of the coloring agent compound having the cationic structure represented by Formula (I) described above and a reduction body thereof, and the liquid crystal compound, it was found that it was possible to produce an infrared polarizing film having excellent absorption anisotropy, which had a maximal absorption wavelength in the infrared region (particularly, a wavelength of 1,000 to 1,700 nm) (Examples 1 to 8).

Example 9

[Production of Coloring Agent-Containing Liquid Crystal Cell 1]

A liquid crystal cell was produced by bonding an indium tin oxide (ITO) substrate (100Ω/□) coated with a vertical alignment film: SE5300 (manufactured by Nissan Chemical Corporation) at a gap of 15 μm.

Next, 5.0 parts by mass of cholesterylnonanoate (manufactured by ADEKA CORPORATION) as a chiral agent and 1.5 parts by mass of the above-described coloring agent (025) as a dichroic coloring agent were mixed with 93.5 parts by mass of CA-32150 (manufactured by ADEKA CORPORATION; Δε: 21.6, Δn: 0.136, nematic liquid crystal) as a rod-like liquid crystal, and the mixture was heated to prepare a liquid crystal composition in which the liquid crystal was dissolved, and then injected into the above-described liquid crystal cell. A pitch length of the liquid crystal composition at this time was 3.9 μm.

Furthermore, a sealing material for liquid crystal Photolec A-704 (manufactured by SEKISUI CHEMICAL CO., LTD.), was added dropwise thereto from the injection port, and the mixture was cured by exposure to UV light to produce a liquid crystal cell 1 for evaluation.

Example 10

A liquid crystal cell 2 for evaluation was produced in the same manner as in Example 1, except that a liquid crystal composition in which, instead of the coloring agent (025), the above-described coloring agent (026) was mixed in an amount of 1.5 parts by mass was used.

Example 11

A liquid crystal cell 3 for evaluation was produced in the same manner as in Example 1, except that a liquid crystal composition in which, instead of the coloring agent (025), the above-described coloring agent (028) was mixed in an amount of 1.5 parts by mass was used.

Comparative Example 4

A liquid crystal cell 11 for evaluation was produced in the same manner as in Example 1, except that the dichroic coloring agent was not contained. A pitch length of the liquid crystal composition at this time was also 3.9 μm.

[Evaluation of Transmittance of Liquid Crystal Cell]

Using a spectrophotometer UV-2400, a transmittance of the liquid crystal cell in a state in which a voltage was not applied (open state) and in a state in which a voltage was applied (square wave, 100 Hz, 10 V) at the maximal absorption wavelength in the infrared region was measured. The results are shown in Table 2.

TABLE 2

| | Pitch length (μm) | Coloring agent compound | Liquid crystal compound | Maximal absorption wavelength (nm) | Transmittance at open state (%) | Transmittance at voltage application (%) |
|---|---|---|---|---|---|---|
| Example 9 | 3.9 | Coloring agent (025) | Rod-like liquid crystal CA-32150 | 1161 | 9.8 | 52.4 |
| Example 10 | 3.9 | Coloring agent (026) | Rod-like liquid crystal CA-32150 | 1162 | 8.3 | 72.4 |
| Example 11 | 3.9 | Coloring agent (028) | Rod-like liquid crystal CA-32150 | 880 | 12.8 | 50.3 |
| Comparative Example 4 | 3.9 | — | Rod-like liquid crystal CA-32150 | — | >90 | >90 |

As shown in Table 2 above, in a case where the coloring agent compound having no cationic structure represented by Formula (I) described above was used, the transmittance was constant regardless of the voltage application, and the desired response performance was not obtained (Comparative Example 4).

On the other hand, the liquid crystal cells produced in Examples 9 to 11 exhibited excellent response performance in the infrared region. In particular, as shown in Examples 9 and 10, in a case of containing the coloring agent compound having the cationic structure represented by Formula (I) described above, high contrast was obtained in the difference in transmittance between the voltage release and the voltage application even with the long wave of 1,100 nm or longer.

What is claimed is:

1. A composition comprising:

at least one specific compound selected from the group consisting of a coloring agent compound having a cationic structure represented by Formula (I) and a reduction body of the coloring agent compound; and a liquid crystal compound, wherein the content of the specific compound is 1 to 30 parts by mass with respect to 100 parts by mass of the liquid crystal compound, (I)

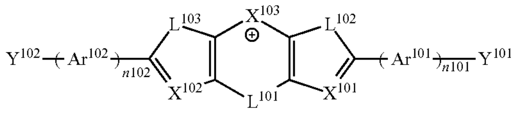

in Formula (I), $L^{101}$ represents —P(═X)$R^A$—, —Si$R^A_2$—, —B$R^A$—, —S(═X)—, or —S(═X)$_2$—, where $R^A$ represents a hydrogen atom or a substituent, provided that, in a case of a plurality of $R^A$'s, the plurality of $R^A$'s may be the same or different from each other, and X represents an oxygen atom, a sulfur atom, or a selenium atom, $L^{102}$ and $L^{103}$ each independently represent —S— or —$X^{104}$=$X^{105}$—, where $X^{104}$ and $X^{105}$ represent —N= or —C($R^A$)=, and $R^A$ represents a hydrogen atom or a substituent, $X^{101}$ and $X^{102}$ each independently represent —N= or —C($R^A$)=, where $R^A$ represents a hydrogen atom or a substituent, provided that, in a case where $X^{101}$ is —C($R^A$)=, the substituent as one aspect of $R^A$ may be bonded to $Ar^{101}$ to form a ring, and in a case where $X^{102}$ is —C($R^A$)=, the substituent as one aspect of $R^A$ may be bonded to $Ar^{102}$ to form a ring, $X^{103}$ represents —$N^+R^B_2$— or —$C^+R^B$—, where $R^B$ represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent, provided that, in a case of a plurality of $R^B$'s, the plurality of $R^B$'s may be the same or different from each other, $Ar^{101}$ and $Ar^{102}$ each independently represent an alkenylene group which may have a substituent, an arylene group which may have a substituent, or a heteroarylene group which may have a substituent, where the arylene group and the heteroarylene group may be monocyclic or polycyclic, and in a case where the heteroarylene group is polycyclic, at least one of a plurality of ring structures may be a hetero ring, $Y^{101}$ and $Y^{102}$ each independently represent —$OR^C$, —$NR^C_2$, or —$SR^C$, where $R^C$ represents a hydrogen atom, an alkyl group which may have a substituent, an alkenyl group which may have a substituent, an alkynyl group which may have a substituent, an aryl group which may have a substituent, or a heteroaryl group which may have a substituent, provided that, in a case of a plurality of $R^C$'s, the plurality of $R^C$'s may be the same or different from each other, and the substituent which may be included in the alkyl group, the alkenyl group, the alkynyl group, the aryl group, and the heteroaryl group may be bonded to $Ar^{101}$ or $Ar^{102}$ to form a ring, and n101 and n102 each independently represent 1 or 2, provided that, in a case where n101 is 2, a plurality of $Ar^{101}$'s may be the same or different from each other, and in a case where n102 is 2, a plurality of $Ar^{102}$'s may be the same or different from each other.

2. The composition according to claim 1, wherein the liquid crystal compound is a rod-shaped liquid crystal compound or disk-shaped liquid crystal compound.

3. The composition according to claim 1, wherein the liquid crystal compound is a polymerizable liquid crystal compound.

4. The composition according to claim 1, wherein the specific compound has a maximal absorption wavelength in a wavelength range of 700 to 1800 nm.

5. An optically anisotropic layer comprising:

at least one specific compound selected from the group consisting of a coloring agent compound having a cationic structure represented by Formula (I) and a reduction body of the coloring agent compound; and a liquid crystal compound, wherein the content of the specific compound is 1 to 30 parts by mass with respect to 100 parts by mass of the liquid crystal compound, (I)

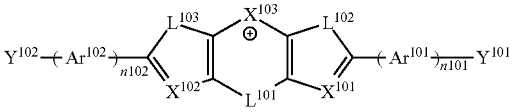

in Formula (I), $L^{101}$ represents —P(=X)$R^A$—, —Si$R^A_2$—, —B$R^A$—, —S(=X)—, or —S(=X)$_2$—, where $R^A$ represents a hydrogen atom or a substituent, provided that, in a case of a plurality of $R^A$'s, the plurality of $R^A$'s may be the same or different from each other, and X represents an oxygen atom, a sulfur atom, or a selenium atom, $L^{102}$ and $L^{103}$ each independently represent —S— or —$X^{104}$=$X^{105}$—, where $X^{104}$ and $X^{105}$ represent —N= or —C($R^A$)=, and $R^A$ represents a hydrogen atom or a substituent, $X^{101}$ and $X^{102}$ each independently represent —N= or —C($R^A$)=, where $R^A$ represents a hydrogen atom or a substituent, provided that, in a case where $X^{101}$ is —C($R^A$)=, the substituent as one aspect of $R^A$ may be bonded to $Ar^{101}$ to form a ring, and in a case where $X^{102}$ is —C($R^A$)=, the substituent as one aspect of $R^A$ may be bonded to $Ar^{102}$ to form a ring, $X^{103}$ represents —$N^+R^B_2$— or —$C^+R^B$—, where $R^B$ represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent, provided that, in a case of a plurality of $R^B$'s, the plurality of $R^B$'s may be the same or different from each other, $Ar^{101}$ and $Ar^{102}$ each independently represent an alkenylene group which may have a substituent, an arylene group which may have a substituent, or a heteroarylene group which may have a substituent, where the arylene group and the heteroarylene group may be monocyclic or polycyclic, and in a case where the heteroarylene group is polycyclic, at least one of a plurality of ring structures may be a hetero ring, $Y^{101}$ and $Y^{102}$ each independently represent —$OR^C$, —$NR^C_2$, or —$SR^C$, where $R^C$ represents a hydrogen atom, an alkyl group which may have a substituent, an alkenyl group which may have a substituent, an alkynyl group which may have a substituent, an aryl group which may have a substituent, or a heteroaryl group which may have a substituent, provided that, in a case of a plurality of $R^C$'s, the plurality of $R^C$'s may be the same or different from each other, and the substituent which may be included in the alkyl group, the alkenyl group, the alkynyl group, the aryl group, and the heteroaryl group may be bonded to $Ar^{101}$ or $Ar^{102}$ to form a ring, and n101 and n102 each independently represent 1 or 2, provided that, in a case where n101 is 2, a plurality of $Ar^{101}$'s may be the same or different from each other, and in a case where n102 is 2, a plurality of Ar$^{102}$'s may be the same or different from each other.

6. An optically anisotropic layer obtained by fixing an alignment state of a composition which contains at least one specific compound selected from the group consisting of a coloring agent compound having a cationic structure represented by Formula (I) and a reduction body of the coloring agent compound, and a polymerizable liquid crystal compound, (I)

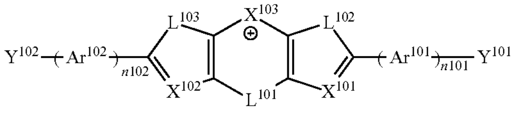

in Formula (I),

L$^{101}$ represents —P(═X)R$^{A}$—, —SiR$^{A}_{2}$—, —BR$^{A}$—, —S(═X)—, or —S(═X)$_2$—, where R$^{A}$ represents a hydrogen atom or a substituent, provided that, in a case of a plurality of R$^{A}$'s, the plurality of R$^{A}$'s may be the same or different from each other, and X represents an oxygen atom, a sulfur atom, or a selenium atom, L$^{102}$ and L$^{103}$ each independently represent —S— or —X$^{104}$═X$^{105}$—, where X$^{104}$ and X$^{105}$ represent —N═ or —C(R$^{A}$)═, and R$^{A}$ represents a hydrogen atom or a substituent, X$^{101}$ and X$^{102}$ each independently represent —N═ or —C(R$^{A}$)═, where R$^{A}$ represents a hydrogen atom or a substituent, provided that, in a case where X$^{101}$ is —C(R$^{A}$)═, the substituent as one aspect of R$^{A}$ may be bonded to Ar$^{101}$ to form a ring, and in a case where X$^{102}$ is —C(R$^{A}$)═, the substituent as one aspect of R$^{A}$ may be bonded to Ar$^{102}$ to form a ring, X$^{103}$ represents —N$^{+}$R$^{B}_{2}$— or —C$^{+}$R$^{B}$—, where R$^{B}$ represents a hydrogen atom, a halogen atom, a hydroxy group, an alkyl group which may have a substituent, an alkenyl group which may have a substituent, an alkynyl group which may have a substituent, an aryl group which may have a substituent, a heteroaryl group which may have a substituent, an alkoxy group which may have a substituent, an aryloxy group which may have a substituent, or an amino group which may have a substituent, provided that, in a case of a plurality of R$^{B}$'s, the plurality of R$^{B}$'s may be the same or different from each other, Ar$^{101}$ and Ar$^{102}$ each independently represent an alkenylene group which may have a substituent, an arylene group which may have a substituent, or a heteroarylene group which may have a substituent, where the arylene group and the heteroarylene group may be monocyclic or polycyclic, and in a case where the heteroarylene group is polycyclic, at least one of a plurality of ring structures may be a hetero ring, Y$^{101}$ and Y$^{102}$ each independently represent —OR$^{C}$, —NR$^{C}_{2}$, or —SR$^{C}$, where R$^{C}$ represents a hydrogen atom, an alkyl group which may have a substituent, an alkenyl group which may have a substituent, an alkynyl group which may have a substituent, an aryl group which may have a substituent, or a heteroaryl group which may have a substituent, provided that, in a case of a plurality of R$^{C}$'s, the plurality of R$^{C}$'s may be the same or different from each other, and the substituent which may be included in the alkyl group, the alkenyl group, the alkynyl group, the aryl group, and the heteroaryl group may be bonded to Ar$^{101}$ or Ar$^{102}$ to form a ring, and n101 and n102 each independently represent 1 or 2, provided that, in a case where n101 is 2, a plurality of Ar$^{101}$'s may be the same or different from each other, and in a case where n102 is 2, a plurality of Ari$^{02}$'s may be the same or different from each other.

7. A liquid crystal cell comprising:
a pair of electrodes; and
a liquid crystal layer provided between the electrodes, which is formed of the composition according to claim 1.

8. A liquid crystal display device comprising:
the optically anisotropic layer according to claim 5.

9. A sensor comprising:
the optically anisotropic layer according to claim 5.

10. A lens comprising:
the optically anisotropic layer according to claim 5.

11. A switching element comprising:
the optically anisotropic layer according to claim 5.

12. An isolator comprising:
the optically anisotropic layer according to claim 5.

13. A camera comprising:
the optically anisotropic layer according to claim 5.

14. A liquid crystal cell comprising:
a pair of electrodes; and
a liquid crystal layer provided between the electrodes, which is formed of the composition according to claim 2.

15. A liquid crystal display device comprising:
the optically anisotropic layer according to claim 6.

16. A sensor comprising:
the optically anisotropic layer according to claim 6.

17. A lens comprising:
the optically anisotropic layer according to claim 6.

18. A switching element comprising:
the optically anisotropic layer according to claim 6.

19. An isolator comprising:
the optically anisotropic layer according to claim 6.

20. A camera comprising:
the optically anisotropic layer according to claim 6.

* * * * *